(12) United States Patent  
Kita

(10) Patent No.: US 9,705,144 B2
(45) Date of Patent: Jul. 11, 2017

(54) HYDROGEN GENERATOR AND FUEL CELL SYSTEM

(71) Applicant: Panasonic Intellectual Property Management Co., Ltd., Osaka (JP)

(72) Inventor: Hiromi Kita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 14/647,804

(22) PCT Filed: Jan. 14, 2014

(86) PCT No.: PCT/JP2014/000114
§ 371 (c)(1),
(2) Date: May 27, 2015

(87) PCT Pub. No.: WO2014/112351
PCT Pub. Date: Jul. 24, 2014

(65) Prior Publication Data
US 2015/0311549 A1    Oct. 29, 2015

(30) Foreign Application Priority Data

Jan. 16, 2013 (JP) ................................. 2013-005158

(51) Int. Cl.
*H01M 8/06* (2016.01)
*C01B 3/38* (2006.01)
(Continued)

(52) U.S. Cl.
CPC ......... *H01M 8/0618* (2013.01); *B01J 8/0465* (2013.01); *B01J 8/0496* (2013.01);
(Continued)

(58) Field of Classification Search
CPC combination set(s) only.
See application file for complete search history.

(56) References Cited

U.S. PATENT DOCUMENTS 2,656,290 A * 10/1953 Berberich ............... H01B 3/04
156/185
6,824,577 B2 * 11/2004 Deshpande ............ B01J 8/0465
422/608
(Continued)

FOREIGN PATENT DOCUMENTS

GB        1445121      8/1976
JP        7-183043 A   7/1995
(Continued)

OTHER PUBLICATIONS

Supplementary European Search Report dated Dec. 21, 2015, Application No. EP14740257.2.
(Continued)

*Primary Examiner* — Kaity Chandler
(74) *Attorney, Agent, or Firm* — McDermott Will & Emery LLP

(57) ABSTRACT

A hydrogen generator includes a hydro-desulfurizer, a reformer, a reactor and an electric heater. The hydro-desulfurizer is operative to remove a sulfur compound in a raw material and including a tubular first wall. The reformer is operative to generate a hydrogen-containing gas by using the raw material supplied from the hydro-desulfurizer. The reactor includes a tubular second wall provided coaxially with the first wall so as to be opposed to the first wall. The electric heater is annularly provided in a gap between the first wall and the second wall so as to extend in an axial direction of the first wall and turn back in the axial direction of the first wall. The electric heater includes a first portion contacting the first wall and a second portion contacting the
(Continued)

second wall. A connecting portion, which connects the first portion and the second portion, has elasticity.

12 Claims, 14 Drawing Sheets

(51) Int. Cl.
    *B01J 19/24*     (2006.01)
    *H01M 8/0612*     (2016.01)
    *H01M 8/0662*     (2016.01)
    *B01J 8/04*     (2006.01)

(52) U.S. Cl.
    CPC ............... *B01J 19/245* (2013.01); *C01B 3/38* (2013.01); *H01M 8/0675* (2013.01); *B01J 2208/00176* (2013.01); *B01J 2208/00407* (2013.01); *B01J 2208/00415* (2013.01); *B01J 2219/00132* (2013.01); *B01J 2219/24* (2013.01); *C01B 2203/0233* (2013.01); *C01B 2203/0283* (2013.01); *C01B 2203/066* (2013.01); *C01B 2203/067* (2013.01); *C01B 2203/127* (2013.01); *C01B 2203/1241* (2013.01); *C01B 2203/1258* (2013.01); *C01B 2203/84* (2013.01)

(56) References Cited

U.S. PATENT DOCUMENTS

| | | | |
|---|---|---|---|
| 2003/0044331 A1* | 3/2003 | DeBellis | B01J 19/0013 422/198 |
| 2003/0188475 A1 | 10/2003 | Ahmed et al. | |
| 2004/0047799 A1* | 3/2004 | Randhava | B01J 8/0465 423/652 |
| 2004/0187386 A1* | 9/2004 | Wangerow | B01J 8/0449 48/198.3 |
| 2005/0235654 A1* | 10/2005 | Kaupert | B01B 1/005 62/50.2 |
| 2006/0124445 A1* | 6/2006 | Labrecque | B01D 53/323 204/170 |
| 2006/0199051 A1* | 9/2006 | Bai | H01M 8/04007 429/425 |
| 2007/0193533 A1* | 8/2007 | Kanda | F22B 1/28 122/4 A |
| 2008/0090112 A1* | 4/2008 | Lee | B01J 8/0411 429/413 |
| 2009/0186246 A1* | 7/2009 | Heo | H01M 8/04022 429/443 |
| 2010/0040519 A1* | 2/2010 | Higashino | B01J 8/0257 422/198 |
| 2014/0072892 A1* | 3/2014 | Maenishi | C01B 3/38 429/423 |
| 2014/0087276 A1* | 3/2014 | Kita | B01D 53/8603 429/410 |

FOREIGN PATENT DOCUMENTS

| | | |
|---|---|---|
| JP | 2008-153151 A | 7/2008 |
| JP | 2010-116304 A | 5/2010 |
| WO | 0002655 A1 | 1/2000 |

OTHER PUBLICATIONS

International Search Report, issued in corresponding International Patent Application No. PCT/JP2014/000114, mailed on Feb. 18, 2014; 2 pages with English translation.

* cited by examiner

A-A' CROSS SECTION     B-B' CROSS SECTION

HYDROGEN GENERATOR AND FUEL CELL SYSTEM

RELATED APPLICATIONS

This application is the U.S. National Phase under 35 U.S.C. §371 of International Patent Application No. PCT/JP2014/000114, filed on Jan. 14, 2014, which in turn claims the benefit of Japanese Patent Application No. 2013-005158, filed on Jan. 16, 2013, the disclosures of which Applications are incorporated by reference herein.

TECHNICAL FIELD

The present invention relates to a hydrogen generator and a fuel cell system and more particularly to a hydrogen generator including a hydro-desulfurizer and a fuel cell system.

BACKGROUND ART

PTL 1 discloses a fuel cell power generation facility including: a desulfurizer configured to remove sulfur from a fuel gas; a reformer configured to generate hydrogen; a carbon monoxide shift converter configured to change carbon monoxide into carbon dioxide; and a fuel cell main body, wherein: a double concentric cylindrical container is provided; the desulfurizer is accommodated in an inner container of the cylindrical container; the carbon monoxide shift converter is accommodated in an outer container of the cylindrical container; a heat retaining material is filled in a gap; and a heater is attached to a side wall of the outer container and a side wall of the inner container, the side walls being opposed to each other.

FIG. 14 is a cross-sectional view showing a schematic configuration of the carbon monoxide shift converter according to Example 1 of PTL 1. A carbon monoxide shift converter 10 is configured such that a catalyst layer 11 filled with catalyst particles is formed between two walls that are a cylindrical inner wall 16a and a cylindrical outer wall 16b which form a double concentric structure. A desulfurizer 17 is configured such that: a catalyst layer is provided between two walls that are a cylindrical outer wall 20 and a desulfurizer outlet pipe 24 which form a double concentric structure; and the catalyst layer is filled with the catalysts.

A heater 14a configured to heat the catalyst layer 11 winds around an inside of the cylindrical inner wall 16a in a spiral manner, and a heater 14b configured to heat the catalyst layer 11 winds around an outside of the cylindrical outer wall 16b. A heat insulating and retaining material 15 is provided at the inside of the cylindrical inner wall 16a and the outside of the cylindrical outer wall 16b. Thus, the entire carbon monoxide shift converter 10 is kept warm.

CITATION LIST

Patent Literature

PTL 1: Japanese Laid-Open Patent Application Publication No. 7-183043

SUMMARY OF INVENTION

Technical Problem

According to the above conventional configuration, the performance of heating the desulfurizer was inadequate. An object of the present invention is to make the performance of heating a desulfurizer higher than before in a hydrogen generator including the desulfurizer and a fuel cell system.

Solution to Problem

A hydrogen generator according to one aspect of the present invention includes: a hydro-desulfurizer operative to remove a sulfur compound in a raw material and including a tubular first wall; a reformer operative to generate a hydrogen-containing gas by using the raw material supplied from the hydro-desulfurizer; a tubular second wall provided coaxially with the first wall so as to be opposed to the first wall; and an electric heater annularly provided in a gap between the first wall and the second wall so as to extend in an axial direction of the first wall and turn back in the axial direction of the first wall.

A fuel cell system according to another aspect of the present invention includes the hydrogen generator and a fuel cell operative to generate electric power by using the hydrogen-containing gas supplied from the hydrogen generator.

Advantageous Effects of Invention

According to the aspect of the present invention, each of the hydrogen generator including the desulfurizer and the fuel cell system has an effect of making the performance of heating the desulfurizer higher than before.

DESCRIPTION OF EMBODIMENTS

Figure 1A:
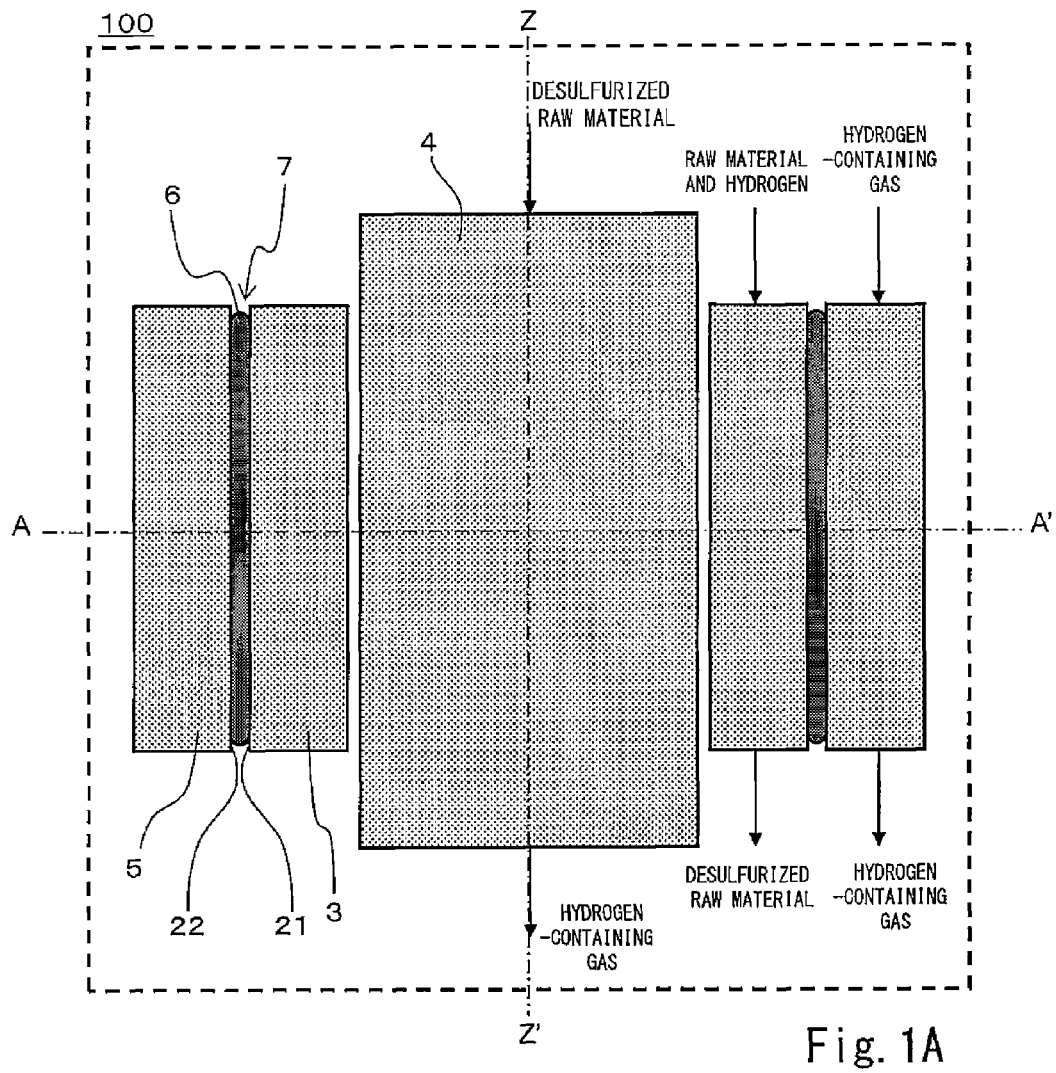
FIG. 1A is a vertical cross-sectional schematic diagram showing one example of a schematic configuration of a hydrogen generator according to Embodiment 1.

A method of making the performance of heating a desulfurizer higher than before in a hydrogen generator including the desulfurizer and a fuel cell system has been diligently studied. As a result, the following findings were obtained.

In a case where means for supplying a hydrogen-containing gas used as a fuel at the time of power generation is not developed as a common raw material infrastructure, a fuel cell system may include a hydrogen generator including a reformer configured to generate a hydrogen-containing gas from a natural gas or a LPG supplied from the common raw material infrastructure.

For example, a steam-reforming reaction is typically performed in the reformer. According to the steam-reforming reaction, for example, a city gas as a raw material and steam are reacted at a high temperature of about 600 to 700° C. using a precious metal based reforming catalyst, such as a Ni-based catalyst or a Ru-based catalyst. With this, the hydrogen-containing gas containing hydrogen as a major component is generated.

A raw material gas, such as the city gas, may contain a sulfur compound. Since the sulfur compound poisons a catalyst, especially the reforming catalyst, the sulfur compound needs to be removed in some way in many cases.

One example of a method of removing the sulfur compound is hydrodesulfurization in which: the hydrogen is added to the raw material; and the sulfur compound is removed by a chemical reaction using the catalyst. To efficiently remove the sulfur compound by the hydrodesulfurization, the temperature of the catalyst needs to be maintained at an optimum temperature for the reaction, that is, a high temperature of about 200 to 300° C., for example. Therefore, at the time of the start-up of the system, the catalyst needs to be heated from outside. As such heating means, an electric heater may be provided outside the hydro-desulfurizer.

It was found that in a case where the electric heater winds around the desulfurizer in a spiral manner as in PTL 1, the adhesion between the electric heater and the desulfurizer tends to be inadequate, and therefore, the performance of heating the desulfurizer also tends to be inadequate. This is because, for example, (i) if the curvature of a curved line of the spiral electric heater and the curvature of a curved surface of a wall of the desulfurizer do not coincide with each other with a high degree of accuracy, the heater and the wall cannot adhere to each other, and (ii) since the spiral electric heater has little stretchability in a radial direction of the desulfurizer, the electric heater hardly deforms so as to contact the wall of the desulfurizer.

It was thought that the electric heater is annularly provided in a gap between a tubular wall of the desulfurizer and another opposing tubular wall so as to extend in an axial direction of the tubular wall and turn back in the axial direction. According to this configuration, the adhesion between the electric heater and the desulfurizer improves, and the performance of heating the desulfurizer can be made higher than before. To be specific, since the electric heater is annularly formed so as to extend in the axial direction and turn back in the axial direction, the stretchability of the electric heater in the radial direction is high, and the electric heater easily deforms so as to contact the wall of the desulfurizer. Therefore, even if the annular electric heater is not formed so as to adhere to the tubular wall of the desulfurizer with a high degree of accuracy, it is expected that the electric heater deforms so as to contact the wall of the desulfurizer by the opposing tubular wall, and thereby the adhesion improves.

Hereinafter, embodiments will be explained in reference to the drawings. In the drawings, the shapes and sizes of components and the positional relations among the components are just examples and are not limited to those shown in the drawings.

In the embodiments, for convenience, a central axis direction of a first wall formed in a tubular shape corresponds to an upper-lower direction. However, a relation between the first wall and a vertical direction in a case where the hydrogen generator is actually installed is not especially limited.

Each of the embodiments explained below is one specific example of the present invention. Numerical values, shapes, materials, components, positions of the components, connections of the components, steps, the order of steps, and the like explained in the embodiments below are just examples, and these do not limit the present invention. Among the components in the embodiments below, components not recited in an independent claim showing the most generic concept of the present invention will be explained as arbitrary components constituting a more desirable embodiment. For ease of understanding, the components are schematically shown in the drawings, and the shapes, the size ratios, and the like may not be accurate. In a manufacturing method, according to need, the order of steps and the like may be changed, and publicly known steps may be added.

Embodiment 1

A hydrogen generator according to Embodiment 1 includes: a hydro-desulfurizer operative to remove a sulfur compound in a raw material and including a tubular first wall; a reformer operative to generate a hydrogen-containing gas by using the raw material supplied from the hydro-desulfurizer; a tubular second wall provided coaxially with the first wall so as to be opposed to the first wall; and an electric heater annularly provided in a gap between the first wall and the second wall so as to extend in an axial direction of the first wall and turn back in the axial direction of the first wall.

According to this configuration, the performance of heating the desulfurizer can be made higher than before.

The above hydrogen generator may include a reactor which needs to be heated, wherein the second wall may be a wall of the reactor.

According to this configuration, both the hydro-desulfurizer and the reactor which needs to be heated can be heated by the electric heater provided in the gap.

Device Configuration

Figure 1B:
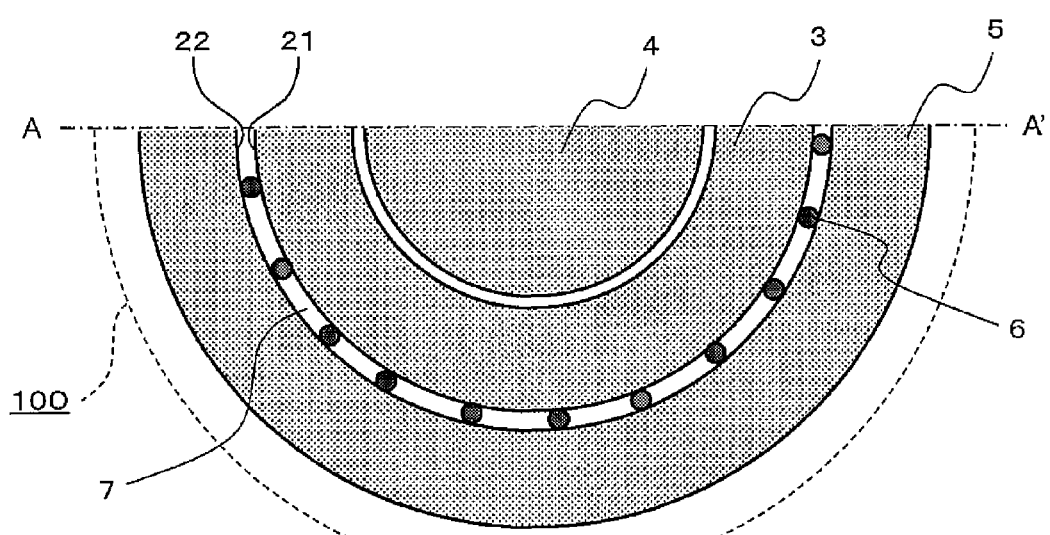
FIG. 1B is a cross-sectional view taken along line A-A' of FIG. 1A.

FIG. 1A is a vertical cross-sectional schematic diagram showing one example of a schematic configuration of the hydrogen generator according to Embodiment 1. FIG. 1B is a cross-sectional view taken along line A-A' of FIG. 1A. In FIG. 1B, an upper half of the hydrogen generator is omitted.

In the example shown in FIG. 1, a hydrogen generator 100 according to Embodiment 1 includes a hydro-desulfurizer 3, a reformer 4, a second wall 22, and an electric heater 6, and the hydro-desulfurizer 3 includes a first wall 21.

The hydro-desulfurizer 3 removes the sulfur compound in the raw material. More specifically, the hydro-desulfurizer 3 removes the sulfur compound in the raw material by a hydrogenation reaction. The hydro-desulfurizer 3 may be configured such that a hydrodesulfurization catalyst is filled in a container. For example, the hydrodesulfurization catalyst may be constituted by: a CoMo-based catalyst which converts the sulfur compound in the raw material into hydrogen sulfide; and at least one of a ZnO-based catalyst and a CuZn-based catalyst, each of which is an adsorbent which is provided downstream of the CoMo-based catalyst and adsorbs the hydrogen sulfide. The hydrodesulfurization catalyst is not limited to the present example. For example, the hydrodesulfurization catalyst may be constituted by only the CuZn-based catalyst having both a function of converting the sulfur compound into the hydrogen sulfide and a function of adsorbing the hydrogen sulfide.

In the example shown in FIG. 1, the hydro-desulfurizer 3 is annularly provided at an outer periphery of the reformer 4 so as to be heat-transferable. An outer shell of the hydro-desulfurizer 3 may be made of metal, such as stainless steel.

Hydrogen necessary for the hydrodesulfurization is supplied to the hydro-desulfurizer 3. Examples of a hydrogen source include: the hydrogen-containing gas discharged from the reformer 4; a gas containing unconsumed hydrogen which is discharged from a hydrogen utilizing device configured to utilize the hydrogen-containing gas discharged from the reformer 4; and a hydrogen bomb.

The raw material is, for example, a raw material containing an organic compound whose constituent elements are at least carbon and hydrogen. Specific examples of the raw material include: hydrocarbons, such as a natural gas, a city gas, a LPG, and a LNG; and alcohols, such as methanol and ethanol. The city gas is a gas supplied from a gas company through pipes to every household.

The sulfur compound may be an odorant component added to the raw material on purpose; and a natural sulfur compound derived from the raw material itself. Specific examples of the sulfur compound include: tertiary-butylmercaptan (TBM); dimethyl sulfide (DMS); tetrahydrothiophene (THT); carbonyl sulfide (COS); and hydrogen sulfide.

The first wall 21 has a tubular shape. The tubular shape does not have to be a completely closed tubular shape, and a part of the tubular shape may be missing. Specifically, in the example shown in FIG. 1, the first wall 21 has a cylindrical shape. The first wall 21 may have a square tubular shape. For example, the first wall 21 may be made of metal, such as stainless steel, which has high thermal conductivity. The hydro-desulfurizer 3 may have a tubular shape. Specifically, for example, the hydro-desulfurizer 3 may have a cylindrical shape or a square tubular shape. Components such as a reformer and a shift converter may be arranged at an inner side of the tubular hydro-desulfurizer 3 along a central axis of the hydro-desulfurizer 3. In this case, the shape of the hydro-desulfurizer 3 may be referred to as an annular shape. The first wall 21 may serve as a wall separating an inside of the hydro-desulfurizer and an outside of the hydro-desulfurizer from each other.

The reformer 4 generates the hydrogen-containing gas by using the raw material supplied from the hydro-desulfurizer 3. Specifically, for example, the reformer 4 causes a reforming reaction of the raw material gas to generate the hydrogen-containing gas. The hydrogen-containing gas generated in the reformer 4 is supplied through a hydrogen supply passage to a hydrogen utilizing device not shown. An outer shell of the reformer 4 may be made of metal, such as stainless steel.

The reforming reaction may be any reforming reaction. Specific examples of the reforming reaction include a steam-reforming reaction, an autothermal reaction, and a partial oxidation reaction. In a case where the steam-reforming reaction is performed as the reforming reaction, the reforming reaction is an endothermic reaction, and the temperature of the reforming catalyst needs to be increased to a high temperature (for example, 600 to 700° C.).

The second wall 22 has a tubular shape and is provided coaxially with the first wall 21 so as to be opposed to the first wall 21. Regarding the term "coaxially", a central axis of the first wall 21 and a central axis of the second wall 22 do not have to completely coincide with each other, and the tubular first wall 21 and the tubular second wall 22 are only required to be opposed to each other at respective portions. The tubular shape does not have to be a completely closed tubular shape, and a part of the tubular shape may be missing. The first wall 21 and the second wall 22 may be configured such that one of the walls 21 and 22 surrounds the other. To be specific, the second wall 22 may be configured to surround the first wall 21, or the first wall 21 may be configured to surround the second wall 22.

Specifically, in the example shown in FIG. 1, the second wall 22 has a cylindrical shape. The second wall 22 may have a square tubular shape. For example, the second wall 22 may be made of metal, such as stainless steel, which has high thermal conductivity. In the example shown in FIG. 1, the second wall 22 is a wall of a shift converter 5. The second wall 22 may be a wall of a reactor which needs to be heated. Examples of the reactor which needs to be heated include: a shift converter; a reformer; and a CO reducer. To be specific, the second wall 22 may be a wall of a reactor that is at least one selected from the group consisting of a shift converter, a reformer, and a CO reducer. The second wall 22 may be a wall separating an inside of the reactor which needs to be heated and an outside of the reactor from each other.

The electric heater 6 is annularly provided in a gap 7 between the first wall 21 and the second wall 22 so as to extend in an axial direction of the first wall 21 and turn back in the axial direction of the first wall 21. In the example shown in FIG. 1, the axial direction is a direction parallel to an axis Z-Z'. The gap 7 may have a size of 3 to 10 mm, for example. At a certain position, the electric heater 6 may contact both the first wall 21 and the second wall 22, may contact one of the first wall 21 and the second wall 22, or may not contact any of the first wall 21 and the second wall 22.

The electric heater 6 is configured to generate heat by the supply of electric power from an outside of the hydrogen generator 100 to heat the hydro-desulfurizer 3. In the example shown in FIG. 1, the electric heater 6 heats the hydro-desulfurizer 3 and also heats the shift converter 5 at the same time.

The axial direction of the first wall 21 may correspond to the axial direction of the hydro-desulfurizer 3. The entire hydrogen generator 100 may have a tubular shape. In this case, the axial direction of the first wall 21 may correspond to the axial direction of the hydrogen generator 100. A portion of the electric heater 6 which extends in the axial direction of the first wall 21 may have a linear shape. The electric heater 6 may be configured to surround the hydro-desulfurizer 3. For example, the electric heater 6 may be constituted by a wire rod. A cross section of the wire rod is not especially limited and may have a circular shape, an oval shape, an annular shape, or a rectangular shape. The electric heater 6 may be, for example, a sheath heater. The thickness of the electric heater 6 may be, for example, 1 to 5 mm. In the example shown in FIG. 1, the electric heater 6 extends around the first wall 21 once. However, the electric heater 6 may extend around the first wall 21 plural times.

Figure 2:
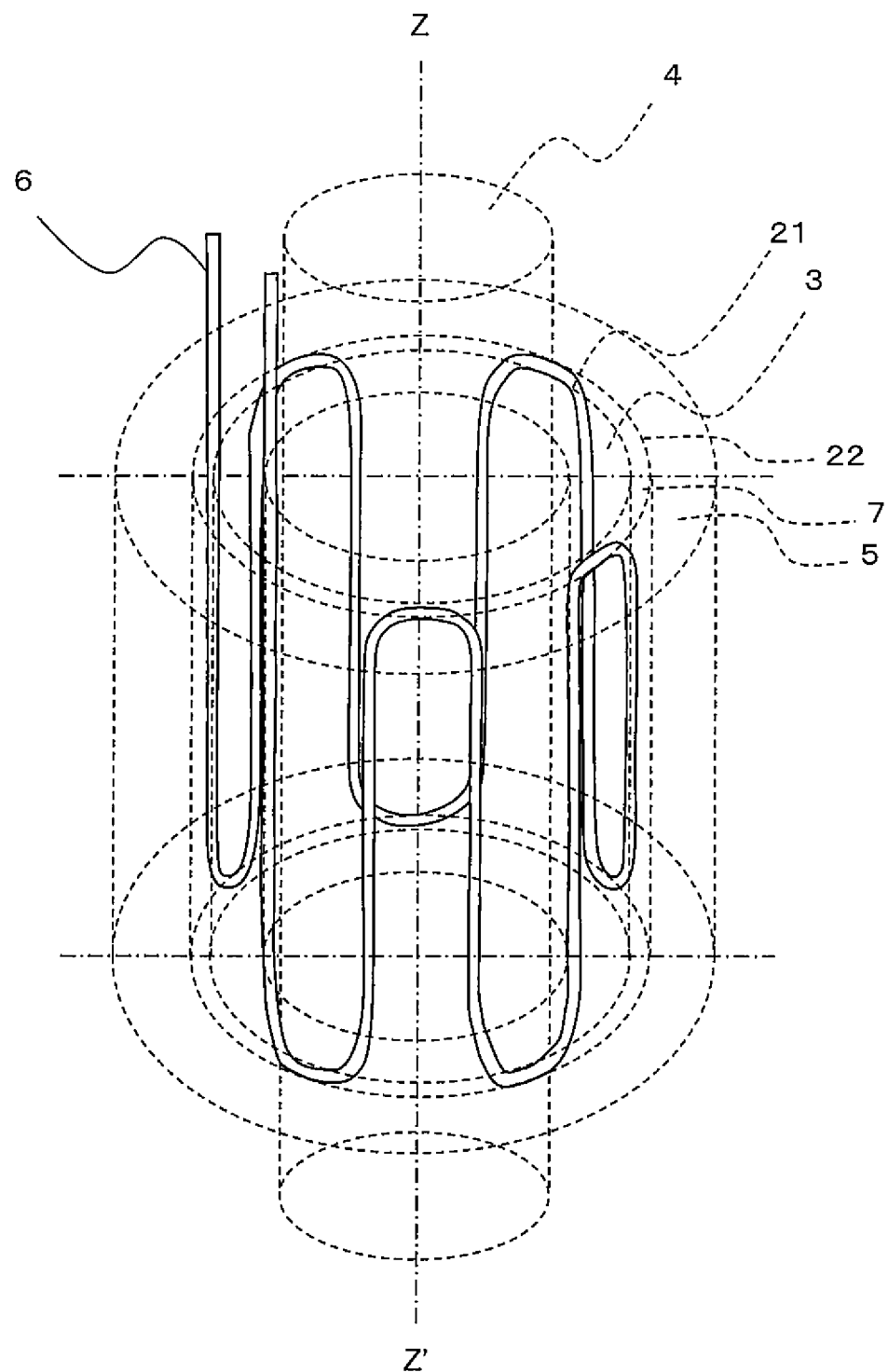
FIG. 2 is a perspective view showing one example of a schematic configuration of an electric heater in Embodiment 1.
Figure 3:
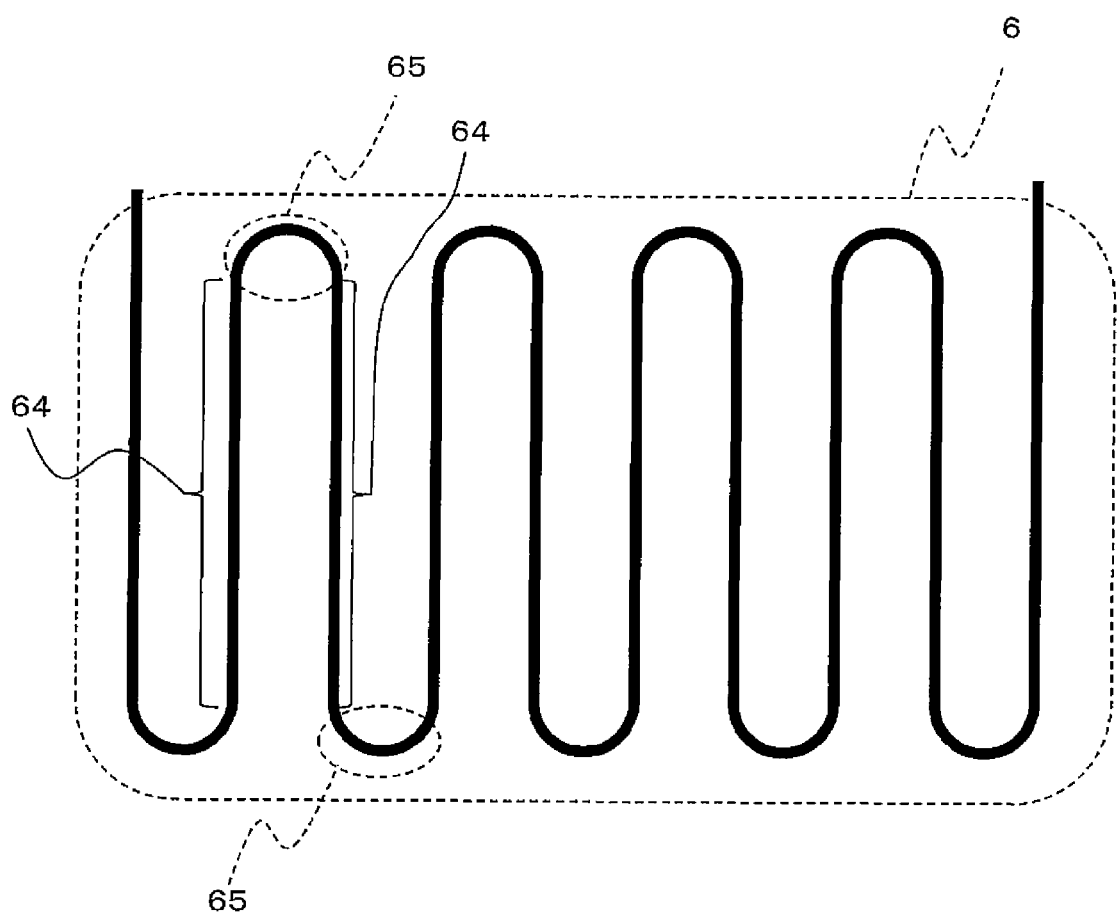
FIG. 3 is a developed view showing one example of a schematic configuration of the electric heater in Embodiment 1.

FIG. 2 is a perspective view showing one example of a schematic configuration of the electric heater in Embodiment 1. FIG. 3 is a developed view showing one example of a schematic configuration of the electric heater in Embodiment 1.

In the example shown in FIG. 2, the electric heater 6 is provided in the gap 7 between the first wall 21 constituting an outer wall of the annular hydro-desulfurizer 3 and the second wall 22 constituting an inner wall of the annular shift converter 5. An upper end surface of the hydro-desulfurizer 3 and an upper surface of the shift converter 5 are flush with each other, and a lower end surface of the hydro-desulfurizer 3 and a lower surface of the shift converter 5 are flush with each other. The electric heater 6 is configured to: get into the gap 7 from an upper side of the hydrogen generator 100; linearly extend to a lower side; turn back to an upper side at a lower end portion of the hydro-desulfurizer 3; extend linearly to the upper side; and turn back to the lower side at an upper end portion of the hydro-desulfurizer 3. The electric heater 6 repeatedly turns back to the upper side and the lower side at the lower end portion and upper end portion of the hydro-desulfurizer 3. Finally, the electric heater 6 gets out from the gap 7 to extend to the upper side.

In the example shown in FIG. 3, the electric heater 6 includes a plurality of axially extending portions 64 and a plurality of axially turning-back portions 65. The axially extending portions 64 and the axially turning-back portions 65 may be formed alternately, repeatedly, continuously to constitute the electric heater 6 having a single sheet shape. The obtained sheet-shaped electric heater 6 may be rounded to have an annular shape and be inserted into the gap 7. The electric heater 6 may be rounded after it is formed in the sheet shape, or the electric heater 6 may be formed in the annular shape from the start. In the example shown in FIG. 3, the electric heater 6 may be said to be formed in a serpentine shape.

The turning-back portions of the electric heater 6 do not have to be located at the lower end portions and upper end portions of the hydro-desulfurizer 3. A plurality of electric heaters 6 may be provided. One example may be such that: two electric heaters 6 are provided; and one of the electric heaters 6 is provided so as to correspond to an upper half of the hydro-desulfurizer 3 and the other is provided so as to correspond to a lower half of the hydro-desulfurizer 3. Another example may be such that: two electric heaters 6 are provided; and one of the electric heaters 6 is provided so as to correspond to a right half of the hydro-desulfurizer 3 and the other is provided so as to correspond to a left half of the hydro-desulfurizer 3. In the examples shown in FIGS. 2 and 3, the electric heater 6 turns back nine times. However, the number of times the electric heater 6 turns back is not especially limited. The number of electric heaters 6 may be one.

Although not shown in FIG. 1, devices required for each reforming reaction may be suitably provided. For example, in a case where the reforming reaction is the steam-reforming reaction, the hydrogen generator 100 may be provided with: a combustor configured to heat the reformer; an evaporator configured to generate steam; and a water supply unit configured to supply water to the evaporator. In a case where the reforming reaction is the autothermal reaction, the hydrogen generator 100 may be further provided with an air supply unit (not shown) configured to supply air to the reformer.

A CO reducer configured to reduce carbon monoxide in the hydrogen-containing gas generated by the reformer 4 may be provided downstream of the reformer 4. The CO reducer may include at least one of: a shift converter configured to reduce the carbon monoxide by a shift reaction; and a CO remover configured to reduce the carbon monoxide by at least one of an oxidation reaction and a methanation reaction.

In the example shown in FIG. 1, the shift converter 5 is provided as the CO reducer. The shift converter 5 is provided at an outer periphery of the hydro-desulfurizer 3 and reduces the carbon monoxide in the hydrogen-containing gas. In the example shown in FIG. 1, the shift converter 5 is annularly provided at the outer periphery of the hydro-desulfurizer 3 so as to be heat-transferable. The shift converter 5 reduces by the shift reaction the carbon monoxide in the hydrogen-containing gas generated by the reformer 4.

The shift converter 5 is filled with a shift catalyst. One example of the shift catalyst is the CuZn-based catalyst. An outer shell of the shift converter 5 may be made of metal, such as stainless steel. The CO remover configured to further reduce the carbon monoxide by at least one of the oxidation reaction and the methanation reaction may be provided downstream of the shift converter 5. In the example shown in FIG. 1, the second wall 22 is a wall of the shift converter 5. In the present embodiment, the shift converter 5 is optional.

In the example shown in FIG. 1, the reformer 4 is arranged at a center, and the hydro-desulfurizer 3 is arranged around the reformer 4. Further, the shift converter 5 is arranged around the hydro-desulfurizer 3. However, which component is arranged at an inner side and which component is arranged at an outer side are not especially limited. Specifically, one example may be such that: the hydro-desulfurizer has a cylindrical shape and is arranged at an innermost side; and the shift converter is arranged around the hydro-desulfurizer. Another example is that: the shift converter has a cylindrical shape and is arranged at an innermost side; and the hydro-desulfurizer is arranged around the shift converter.

According to the configuration shown in FIG. 1, two reactors that are the hydro-desulfurizer 3 and the shift converter 5 mainly linearly contact the electric heater 6 in the axial direction. Therefore, the adhesion between each reactor and the electric heater becomes higher than that in a case where the electric heater is wound in a spiral shape. Thus, the heat utilization efficiency by the thermal conduction can be improved.

Further, the two reactors that are the hydro-desulfurizer 3 and the shift converter 5 can be heated at the same time by the single electric heater. Therefore, it is unnecessary to provide the heater for each container, so that the manufacturing cost for the electric heater can be reduced.

Operations

Hereinafter, one example of the operations of the hydrogen generator 100 will be explained in reference to FIG. 1. The operations of the hydrogen generator 100 according to the present embodiment are applicable to any of Examples 1 to 5 of the present embodiment.

The hydro-desulfurizer 3 is supplied with the raw material through a raw material supply passage not shown. A part of the hydrogen-containing gas discharged from the reformer 4 is added to the raw material flowing through the raw material supply passage. The raw material to which the hydrogen is added is supplied to the hydro-desulfurizer 3, and the sulfur compound in the raw material is removed by the reaction under the existence of the hydrodesulfurization catalyst. Then, the desulfurized raw material is supplied to the reformer 4 through a raw material discharge passage not shown. In the reformer 4, the hydrogen-containing gas is generated from the raw material by the reforming reaction. The hydrogen-containing gas generated by the reformer 4 is supplied to the shift converter 5 except for the hydrogen-containing gas added to the raw material. In the shift converter 5, the carbon monoxide contained in the hydrogen-containing gas is reduced by the shift reaction. Then, the hydrogen-containing gas in which the carbon monoxide is reduced is supplied to the hydrogen utilizing device not shown.

The electric heater provided in the gap 7 between the hydro-desulfurizer 3 and the shift converter 5 is activated at the time of the start-up of the hydrogen generator 100. The electric heater increases each of the temperatures of the hydro-desulfurizer 3 and the shift converter 5 to a proper temperature (for example, 250 to 300° C.) at which the hydrodesulfurization catalyst and the shift catalyst act.

Example 1

The hydrogen generator according to Example 1 is configured such that: the hydrogen generator according to Embodiment 1 includes a reactor which needs to be heated; the second wall is a wall of the reactor; and the electric heater includes a first portion contacting the first wall and a second portion contacting the second wall.

In the above hydrogen generator, the electric heater may be configured such that a distance from a central axis of the first wall to the electric heater changes at an intervening portion between the first portion and the second portion.

The present example will explain a case where the reactor is the shift converter.

Figure 4:
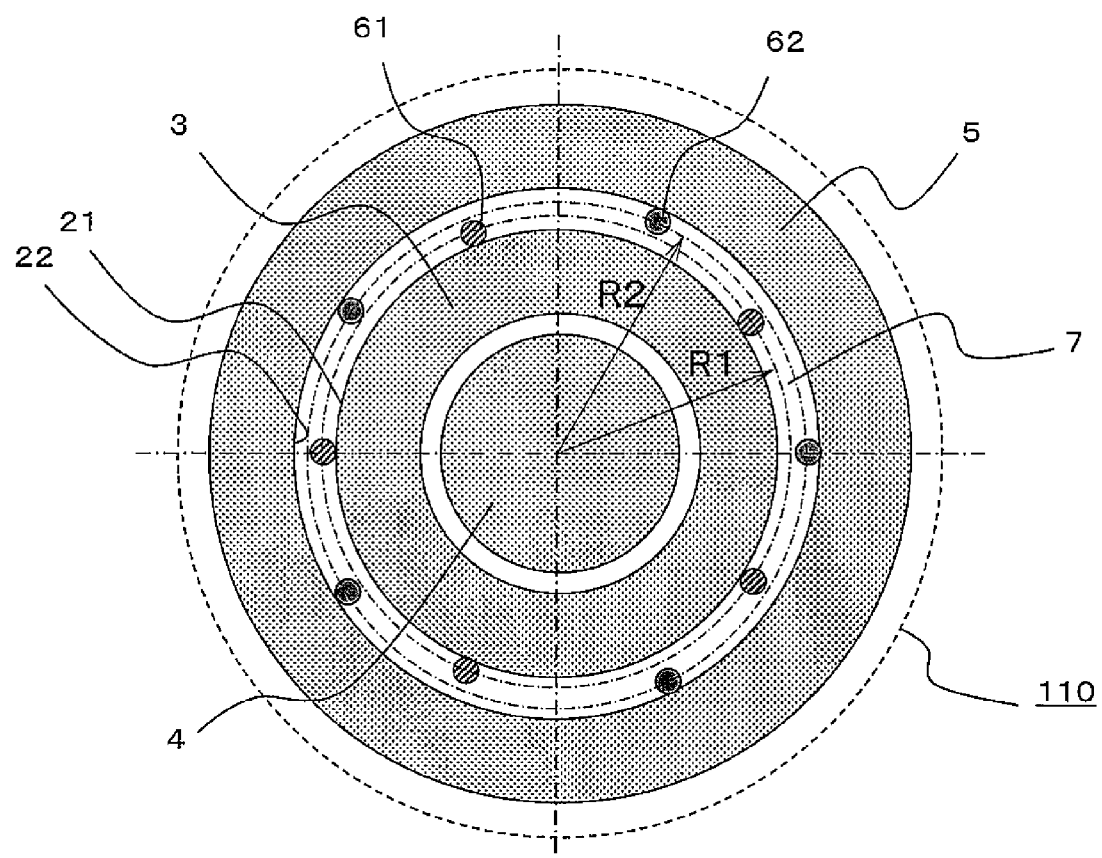
FIG. 4 is a horizontal cross-sectional schematic diagram showing one example of a schematic configuration of the hydrogen generator according to Example 1 of Embodiment 1.
Figure 5A:
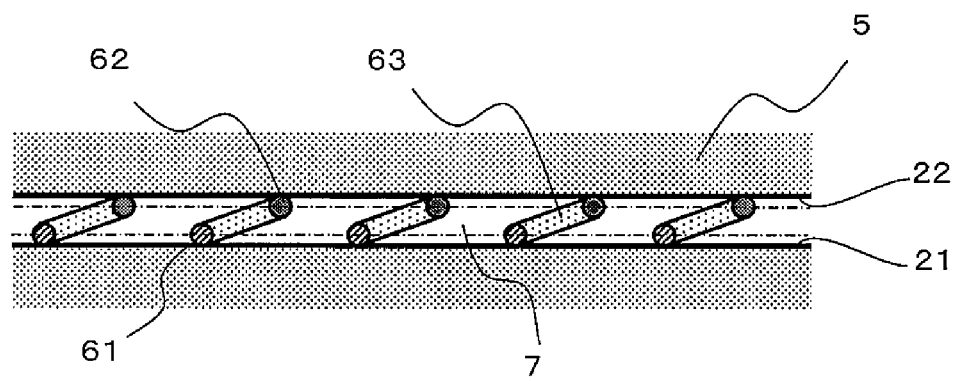
FIG. 5A is a conceptual diagram showing one example of a schematic configuration of the electric heater in Example 1 of Embodiment 1.
Figure 5B:
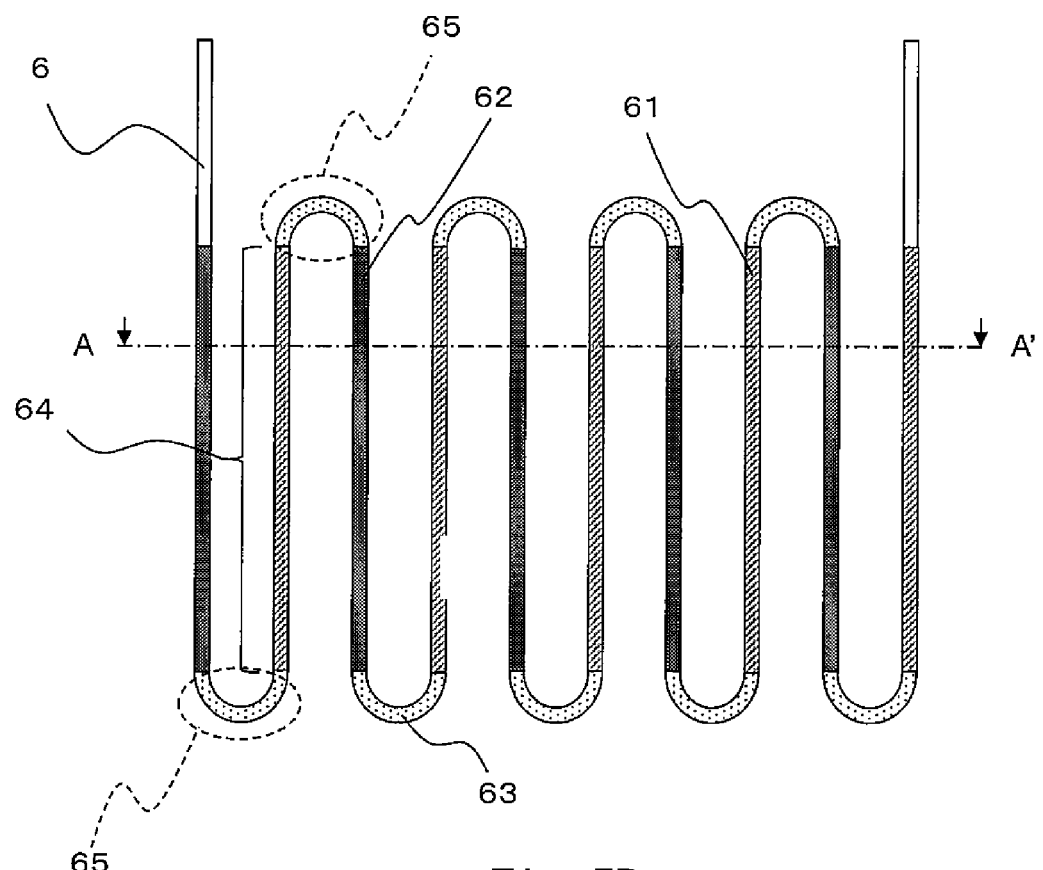
FIG. 5B is a developed view showing one example of a schematic configuration of the electric heater in Example 1 of Embodiment 1.

FIG. 4 is a horizontal cross-sectional schematic diagram showing one example of a schematic configuration of the hydrogen generator according to Example 1 of Embodiment 1. FIG. 5A is a conceptual diagram showing one example of a schematic configuration of the electric heater in Example 1 of Embodiment 1. FIG. 5B is a developed view showing one example of a schematic configuration of the electric heater in Example 1 of Embodiment 1. FIG. 5A is a cross-sectional view taken along line A-A' of FIG. 5B.

A hydrogen generator 110 according to the present example is the same as the hydrogen generator 100 according to Embodiment 1 shown in FIGS. 1 to 3 except that the configuration of the electric heater 6 is further specified. Therefore, in FIGS. 1 to 3 and FIGS. 4 and 5, the same reference signs and names are used for the same components, and detailed explanations thereof are omitted.

In the present example, the electric heater 6 is annularly provided in the gap 7 between the first wall 21 and the second wall 22 so as to extend in the axial direction of the first wall 21 and turn back in the axial direction of the first wall 21, and linear portions of the heater include first portions 61 contacting the first wall 21 and second portions 62 contacting the second wall 22. As in the example shown in FIG. 4, in a case where the first wall 21 is provided at the inner side of the second wall 22, a radius R1 of the first portion 61 is smaller than a radius R2 of the second portion 62. In other words, in a case where the first wall 21 is provided at the inner side of the second wall 22, a distance R1 from the central axis of the first wall 21 to the first portion 61 is shorter than a distance R2 from the central axis of the first wall 21 to the second portion 62.

The first portions 61 and the second portions 62 may be arranged alternately. In this case, the number of first portions 61 and the number of second portions 62 may be equal to each other. According to this configuration, the electric heater 6 equally heats the first wall 21 and the second wall 22. In the example shown in FIG. 4, the first wall 21 is a wall of the hydro-desulfurizer 3, and the second wall is the wall of the shift converter 5. Therefore, the electric heater 6 equally heats the hydro-desulfurizer 3 and the shift converter 5.

In the present example, the diameter of the annular electric heater 6 changes at an intervening portion 63 between the first portion 61 and the second portion 62. In other words, the distance from the central axis of the first wall 21 to the electric heater 6 changes at the intervening portion 63 between the first portion 61 and the second portion 62. In the example shown in FIG. 4, both the first portion 61 and the second portion 62 are the axially extending portions 64.

According to this configuration, in a case where the electric heater 6 is constituted by, for example, a metal pipe, the intervening portion 63 between the first portion 61 and the second portion 62 has elasticity (spring property). In the configuration shown in FIG. 4, by utilizing the elasticity (spring property), the first portion 61 can be pressed against an outer peripheral surface of the hydro-desulfurizer 3, and the second portion 62 can be pressed against an inner peripheral surface of the shift converter 5. As a result, the adhesion between the electric heater 6 and each container can be further improved, so that the heat utilization efficiency improves.

In the example shown in FIG. 5B, the intervening portion 63 coincides with the axially turning-back portion 65 of FIG. 4. However, as described below, the intervening portion 63 does not have to coincide with the axially turning-back portion 65.

Further, in a case where the gap 7 between two containers is set to be larger than the thickness (diameter) of the electric heater, the insertion of the electric heater 6 into the gap 7 at the time of assembly becomes easily, so that the work efficiency improves. Even in a case where the size of the gap 7 varies, the adhesion between the electric heater 6 and each reactor can be secured by the elasticity (spring property) of the electric heater 6 itself. Therefore, the heat utilization efficiency improves, and labor for controlling the size of the gap 7 can be reduced.

The same modifications as in Embodiment 1 can be made in the present example.

Example 2

The hydrogen generator according to Example 2 is the same as the hydrogen generator according to Example 1 in that: the hydrogen generator according to Example 2 is the hydrogen generator according to Embodiment 1 and further includes a reactor which needs to be heated; the second wall is a wall of the reactor; the electric heater includes a first portion contacting the first wall and a second portion contacting the second wall; and the electric heater may be configured such that a distance from a central axis of the first wall to the electric heater changes at an intervening portion between the first portion and the second portion.

The present example is different from Example 1 shown in FIGS. 4 and 5 in that the first portion and the second portion are formed at one axially extending portion 64.

As with Example 1, the present example will explain a case where the reactor is the shift converter.

Figure 6A:
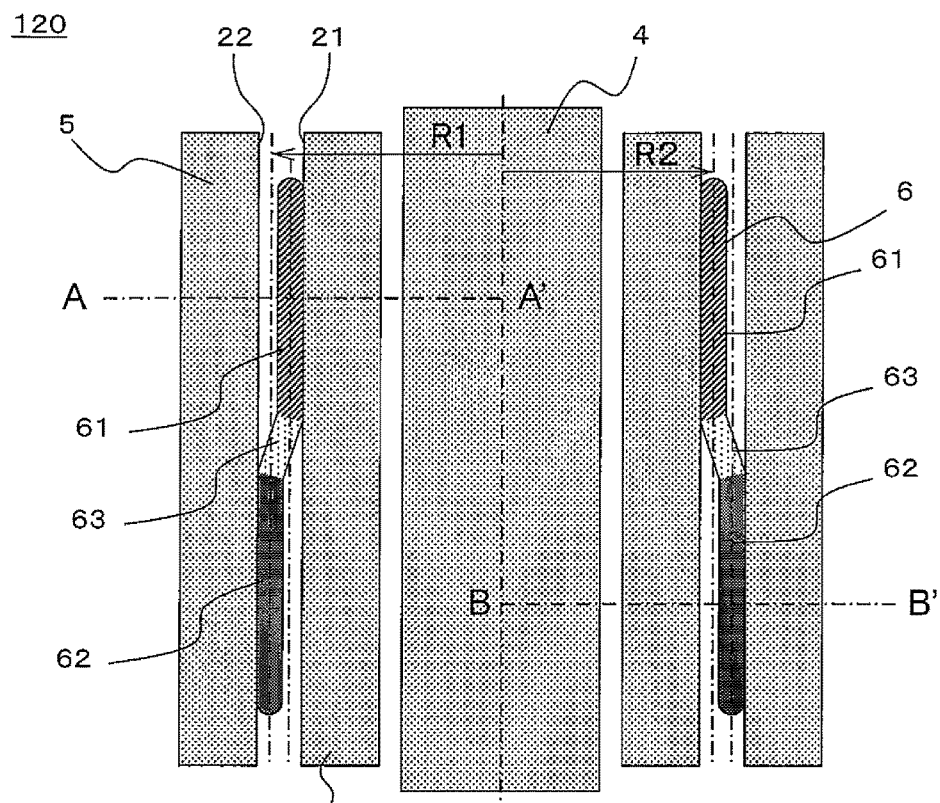
FIG. 6A is a vertical cross-sectional schematic diagram showing one example of a schematic configuration of the hydrogen generator according to Example 2 of Embodiment 1.
Figure 6B:
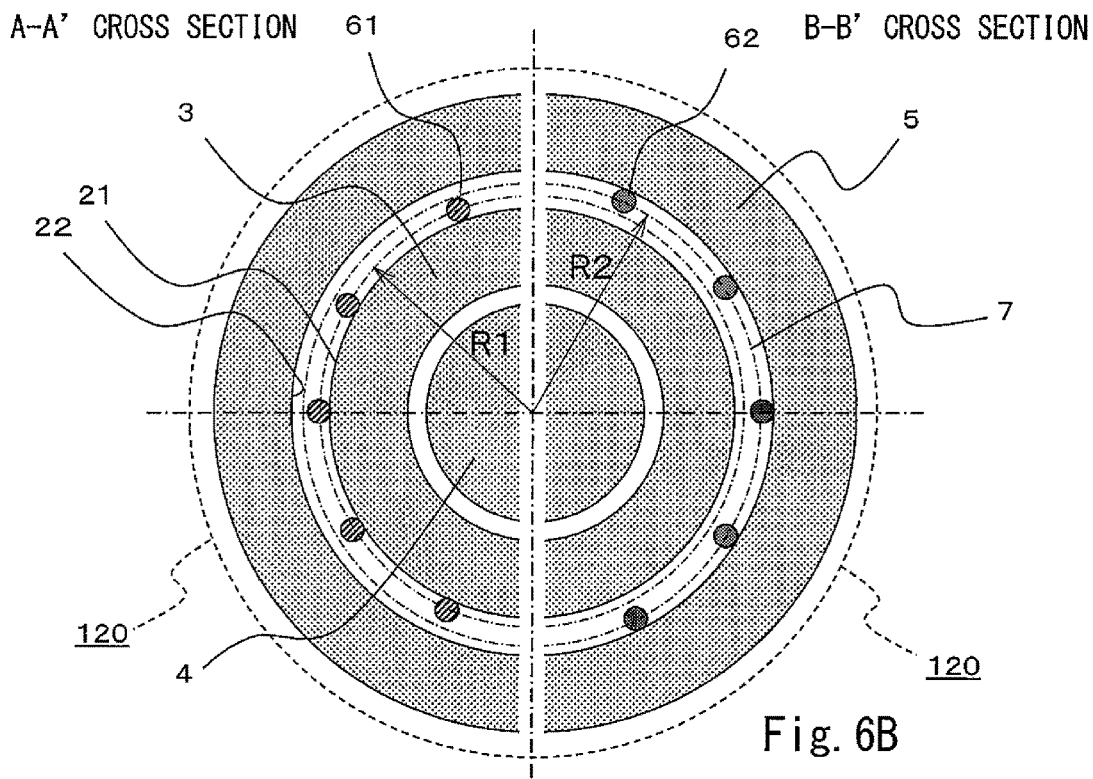
FIG. 6B is a cross-sectional view taken along line A-A' of FIG. 6A and a cross-sectional view taken along line B-B' of FIG. 6A.
Figure 7A:
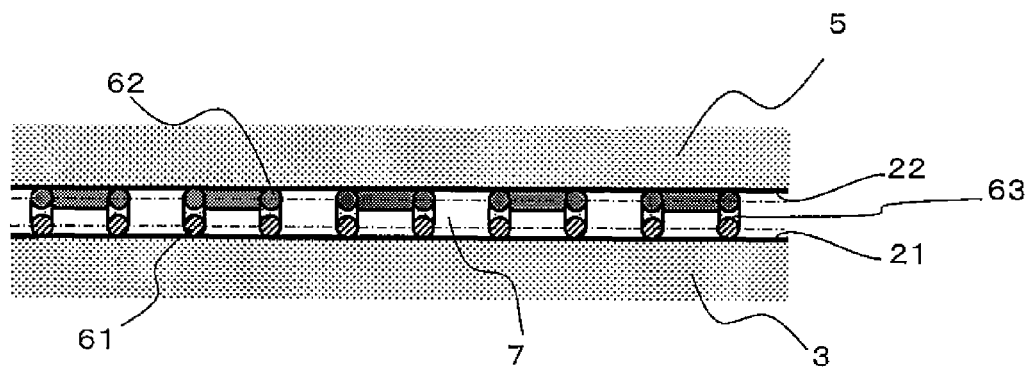
FIG. 7A is a conceptual diagram showing one example of a schematic configuration of the electric heater in Example 2 of Embodiment 1.
Figure 7B:
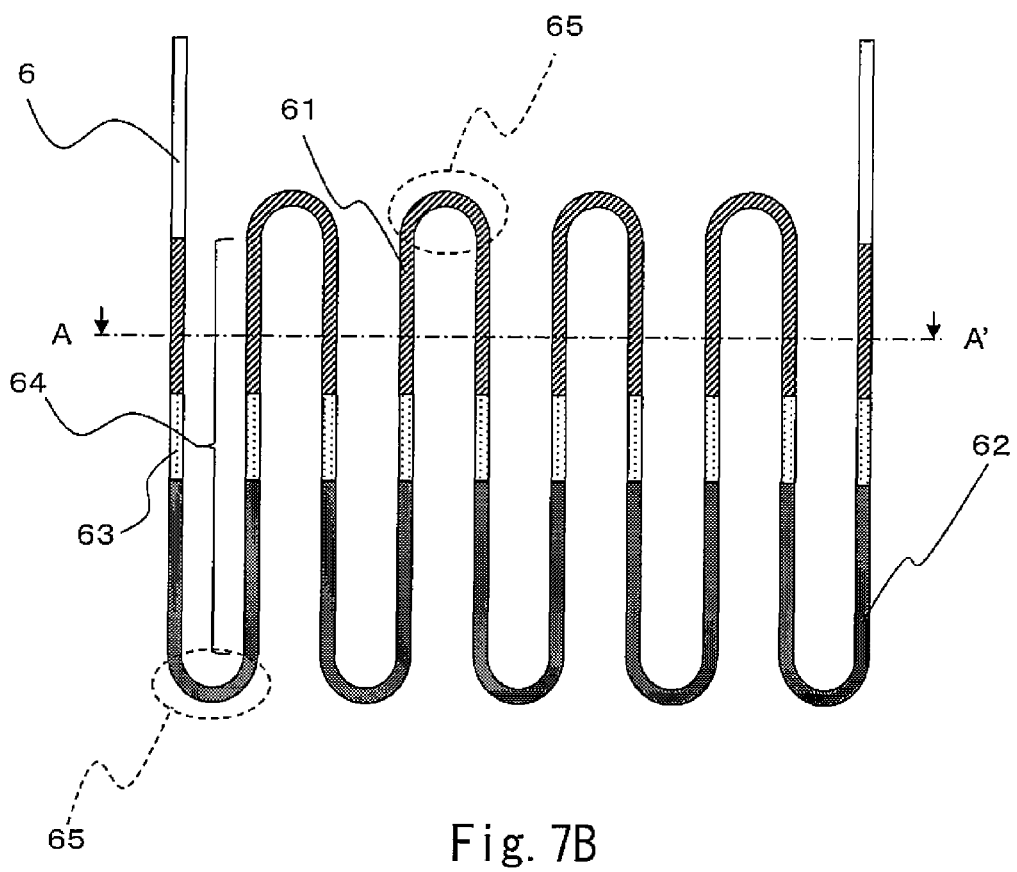
FIG. 7B is a developed view showing one example of a schematic configuration of the electric heater in Example 2 of Embodiment 1.

FIG. 6A is a vertical cross-sectional schematic diagram showing one example of a schematic configuration of the hydrogen generator according to Example 2 of Embodiment 1. A left side of FIG. 6B is a cross-sectional view (a right side portion is omitted) taken along line A-A' of FIG. 6A. A right side of FIG. 6B is a cross-sectional view (a left side portion is omitted) taken along line B-B' of FIG. 6A. FIG. 7A is a conceptual diagram showing one example of a schematic configuration of the electric heater in Example 2 of Embodiment 1. FIG. 7B is a developed view showing one example of a schematic configuration of the electric heater in Example 2 of Embodiment 1. FIG. 7A is a cross-sectional view taken along line A-A' of FIG. 7B.

A hydrogen generator 120 according to the present example is the same as the hydrogen generator 100 according to Embodiment 1 shown in FIGS. 1 to 3 except that the configuration of the electric heater 6 is further specified. Therefore, in FIGS. 1 to 3 and FIGS. 6 and 7, the same reference signs and names are used for the same components, and detailed explanations thereof are omitted.

In the present example, the electric heater 6 is annularly provided in the gap 7 between the first wall 21 and the second wall 22 so as to extend in the axial direction of the first wall 21 and turn back in the axial direction of the first wall 21, and the linear portions (axially extending portions 64) of the electric heater 6 include the first portions 61 contacting the first wall 21 and the second portions 62 contacting the second wall 22. As in the example shown in FIG. 10, in a case where the first wall 21 is provided at the inner side of the second wall 22, the radius R1 of the first portion 61 is smaller than the radius R2 of the second portion 62. In other words, in a case where the first wall 21 is provided at the inner side of the second wall 22, the distance R1 from the central axis of the first wall 21 to the first portion 61 is shorter than the distance R2 from the central axis of the first wall 21 to the second portion 62.

Further, in the present example, the first portion 61 is formed at an upper portion of one axially extending portion 64 sandwiched between two axial second portions 62, and the second portion 62 is formed at a lower portion of the axially extending portion 64. However, the first portion 61 may be formed at the lower portion of the axially extending portion 64, and the second portion 62 may be formed at the upper portion of the axially extending portion 64. The first portion 61 and the second portion are connected to each other by the intervening portion 63.

In the example shown in FIG. 7B, in each of all the axially extending portions 64 of the electric heater 6, the first portion 61 is formed at the upper portion, and the second portion 62 is formed at the lower portion. However, the present example is not limited to this. Specifically, for example, a portion in which the first portion 61 is formed at the upper portion and the second portion 62 is formed at the lower portion and a portion in which the first portion 61 is formed at the lower portion and the second portion 62 is formed at the upper portion may be formed alternately.

The same modifications as in Embodiment 1 can be made in the present example.

Example 3

The hydrogen generator according to Example 3 is the same as the hydrogen generator according to Example 1 in that: the hydrogen generator according to Example 3 is the hydrogen generator according to Embodiment 1 and further includes a reactor which needs to be heated; the second wall is a wall of the reactor; the electric heater includes a first portion contacting the first wall and a second portion contacting the second wall; and the electric heater may be configured such that a distance from a central axis of the first wall to the electric heater changes at an intervening portion between the first portion and the second portion.

The hydrogen generator according to Example 3 is the same as the hydrogen generator according to Example 2 in that the first portion and the second portion are formed at one axially extending portion 64.

The present example is different from Example 2 shown in FIGS. 6 and 7 in that two first portions and one second portion are formed at one axially extending portion 64.

As with Example 1, the present example will explain a case where the reactor is the shift converter.

Figure 8A:
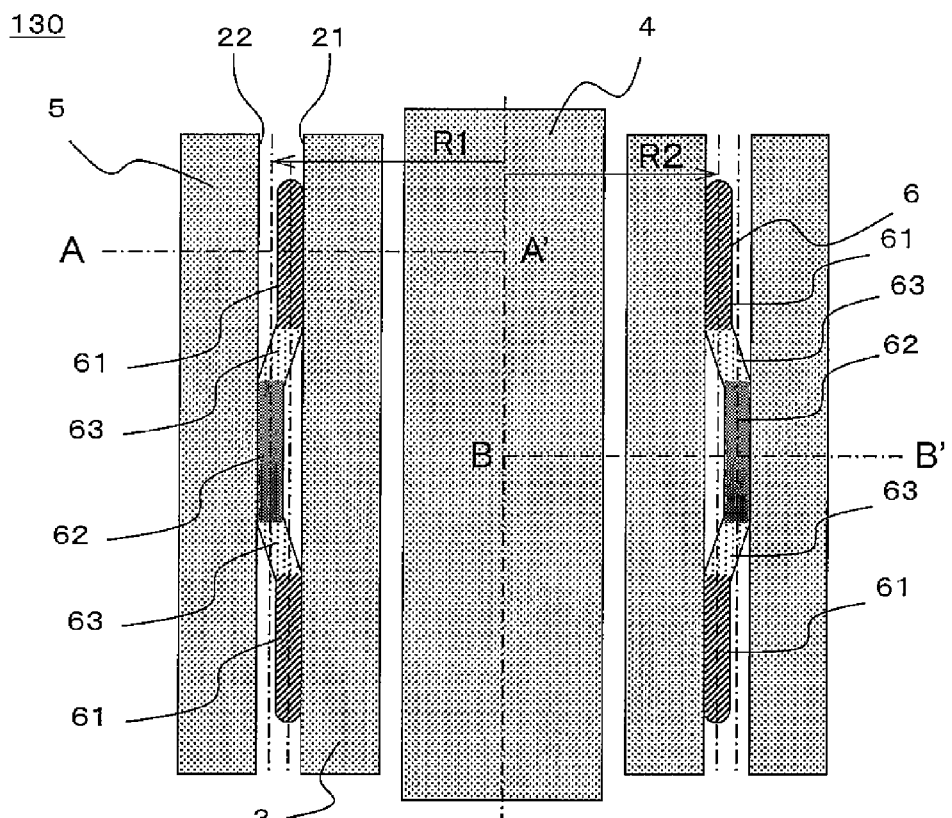
FIG. 8A is a vertical cross-sectional schematic diagram showing one example of a schematic configuration of the hydrogen generator according to Example 3 of Embodiment 1.
Figure 8B:
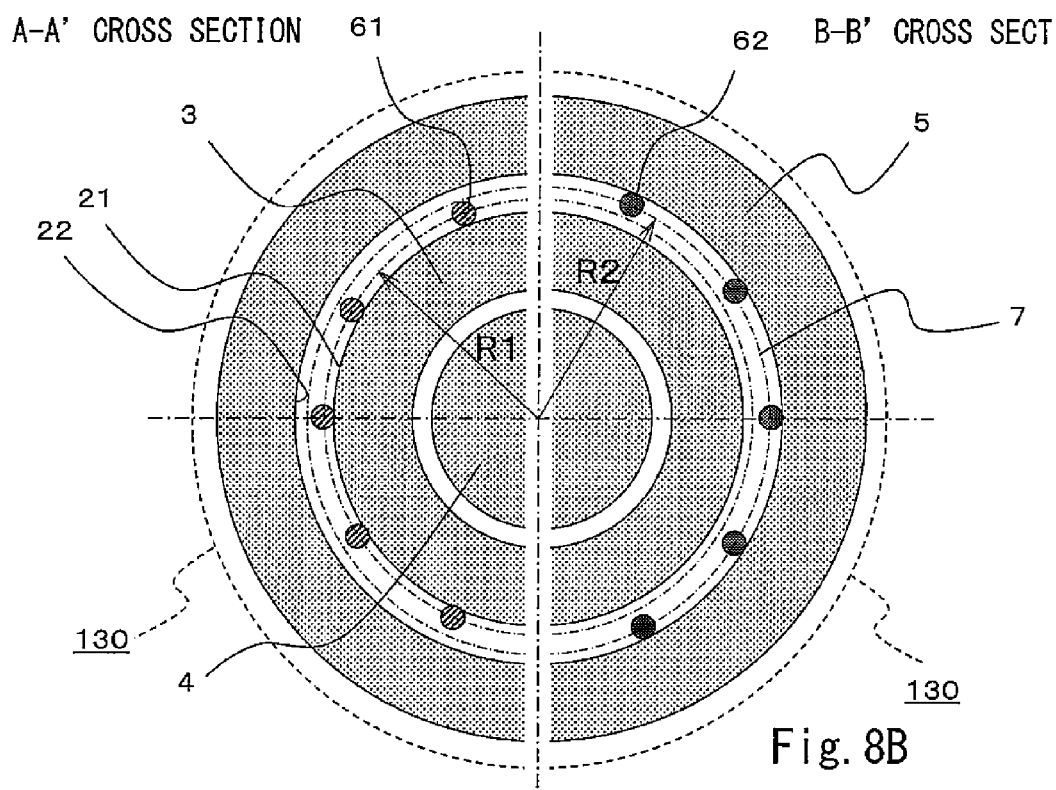
FIG. 8B is a cross-sectional view taken along line A-A' of FIG. 8A and a cross-sectional view taken along line B-B' of FIG. 8A.
Figure 9A:
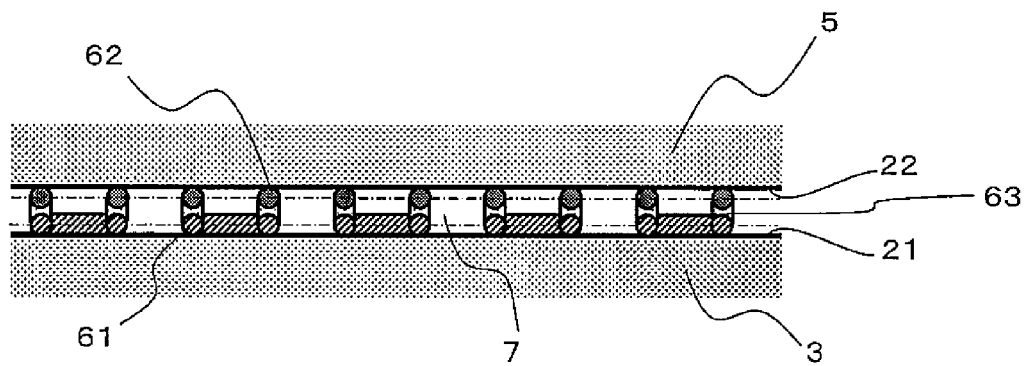
FIG. 9A is a conceptual diagram showing one example of a schematic configuration of the electric heater according to Example 3 of Embodiment 1.
Figure 9B:
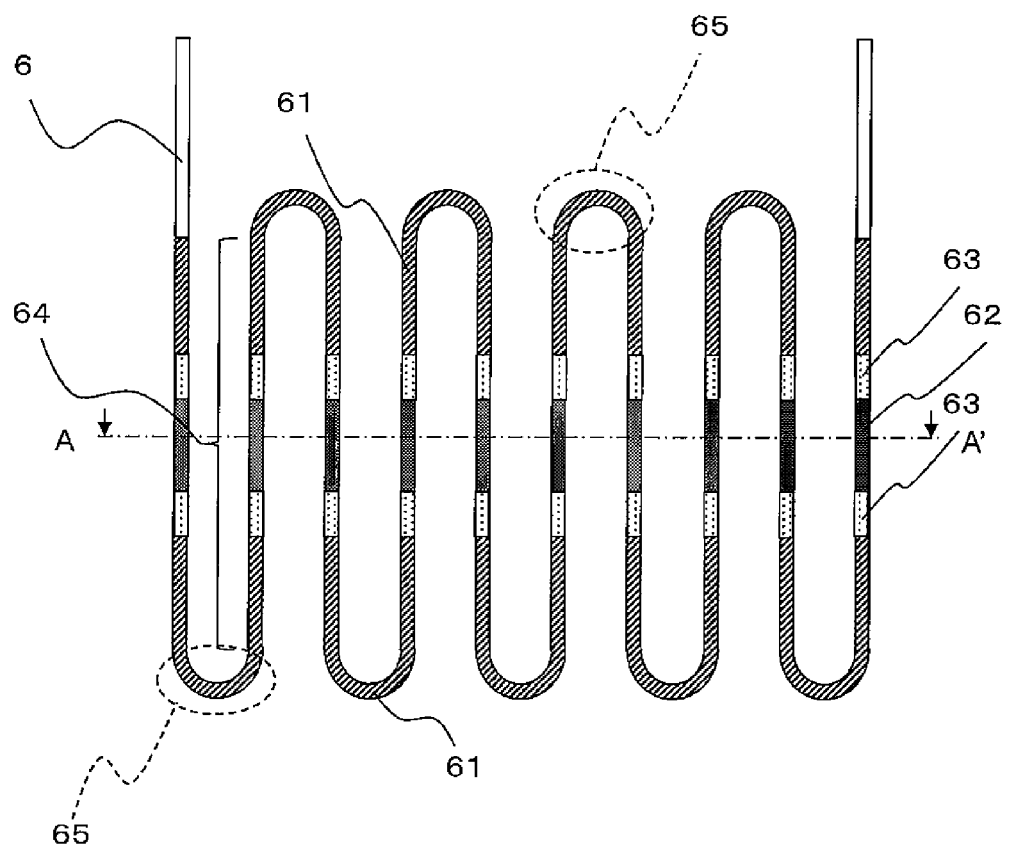
FIG. 9B is a developed view showing one example of a schematic configuration of the electric heater in Example 3 of Embodiment 1.

FIG. 8A is a vertical cross-sectional schematic diagram showing one example of a schematic configuration of the hydrogen generator according to Example 3 of Embodiment 1. A left side of FIG. 8B is a cross-sectional view (a right side portion is omitted) taken along line A-A' of FIG. 8A. A right side portion of FIG. 8B is a cross-sectional view (a left side portion is omitted) taken along line B-B' of FIG. 8A. FIG. 9A is a conceptual diagram showing one example of a schematic configuration of the electric heater in Example 3 of Embodiment 1. FIG. 9B is a developed view showing one example of a schematic configuration of the electric heater in Example 3 of Embodiment 1. FIG. 9A is a cross-sectional view taken along line A-A' of FIG. 9B.

A hydrogen generator 130 according to the present example is the same as the hydrogen generator 100 according to Embodiment 1 shown in FIGS. 1 to 3 except that the configuration of the electric heater 6 is further specified. Therefore, in FIGS. 1 to 3 and FIGS. 8 and 9, the same reference signs and names are used for the same components, and detailed explanations thereof are omitted.

In the present example, the electric heater 6 is annularly provided in the gap 7 between the first wall 21 and the second wall 22 so as to extend in the axial direction of the first wall 21 and turn back in the axial direction of the first wall 21, and the linear portions (axially extending portions 64) of the heater include the first portions 61 contacting the first wall 21 and the second portions 62 contacting the second wall 22. As in the example shown in FIG. 10, in a case where the first wall 21 is provided at the inner side of the second wall 22, the radius R1 of the first portion 61 is smaller than the radius R2 of the second portion 62. In other words, in a case where the first wall 21 is provided at the inner side of the second wall 22, the distance R1 from the central axis of the first wall 21 to the first portion 61 is shorter than the distance R2 from the central axis of the first wall 21 to the second portion 62.

Further, in the present example, the first portions 61 are respectively formed at upper and lower portions of one axially extending portion 64 sandwiched between two axially turning-back portions 65, and the second portion 62 is formed at a middle portion of the axially extending portion 64. However, the first portion 61 may be formed at the middle portion, and the second portions 62 may be respectively formed at the upper and lower portions. The first portion 61 and the second portion are connected to each other by the intervening portion 63.

In the example shown in FIG. 7B, in each of all the axially extending portions 64 of the electric heater 6, the first portions 61 are respectively formed at the upper and lower portions, and the second portion 62 is formed at the middle portion. However, the present example is not limited to this. Specifically, for example, a portion in which the first portions 61 are respectively formed at the upper and lower portions and the second portion 62 is formed at the middle portion and a portion in which the first portion 61 is formed at the middle portion and the second portions 62 are respectively formed at the upper and lower portions may be formed alternately. Or, for example, Examples 1, 2, and 3 may be suitably combined. To be specific, in the electric heater 6, it is possible to suitably adjust which portion is formed as the first portion 61 and which portion is formed as the second portion 62.

The same modifications as in Embodiment 1 can be made in the present example.

Example 4

The hydrogen generator according to Example 4 is the same as the hydrogen generator according to Example 1 in that: the hydrogen generator according to Example 4 is the hydrogen generator according to Embodiment 1 and further includes a reactor which needs to be heated; the second wall is a wall of the reactor; the electric heater includes a first portion contacting the first wall and a second portion contacting the second wall; and the electric heater may be configured such that a distance from a central axis of the first wall to the electric heater changes at an intervening portion between the first portion and the second portion.

In the hydrogen generator according to the present example, the reactor is a shift converter provided at an outer periphery of the hydro-desulfurizer and reduces the carbon monoxide in the hydrogen-containing gas.

In the hydrogen generator, an occupancy rate of the first portion in the electric heater may be higher than the occupancy rate of the second portion in the electric heater.

To be specific, the occupancy rate of the first portion in the electric heater is set to be higher than the occupancy rate of the second portion in the electric heater depending on heat capacities of the hydro-desulfurizer and the shift converter.

According to this configuration, the amount of heat applied to the hydro-desulfurizer becomes larger than the amount of heat applied to the shift converter. The shift converter generates heat by the reaction, but the hydro-desulfurizer does not generate heat by the reaction. Therefore, by increasing the amount of heat applied to the hydro-desulfurizer by the electric heater, the hydro-desulfurizer can be efficiently increased in temperature.

Figure 10:
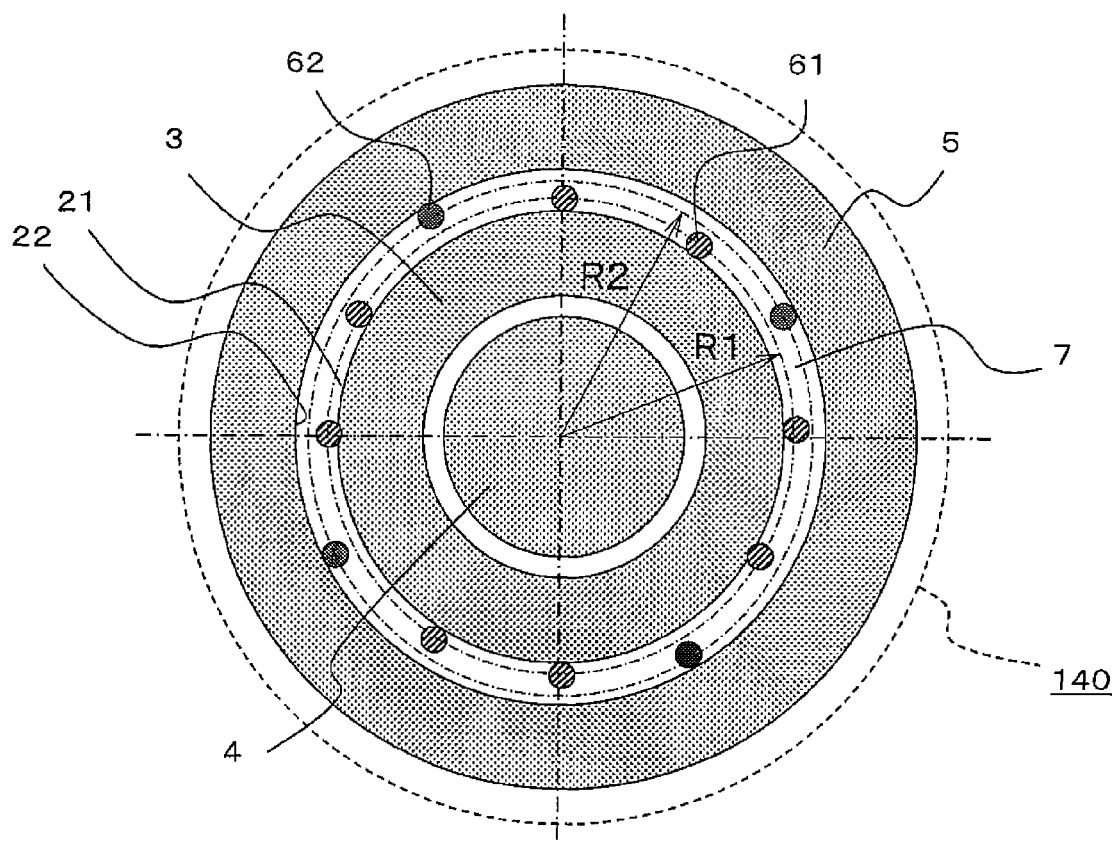
FIG. 10 is a horizontal cross-sectional schematic diagram showing one example of a schematic configuration of the hydrogen generator according to Example 4 of Embodiment 1.
Figure 11A:
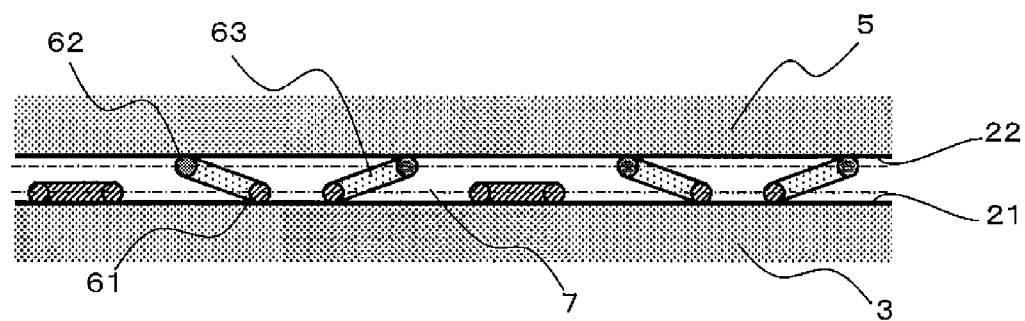
FIG. 11A is a conceptual diagram showing one example of a schematic configuration of the electric heater in Example 4 of Embodiment 1.
Figure 11B:
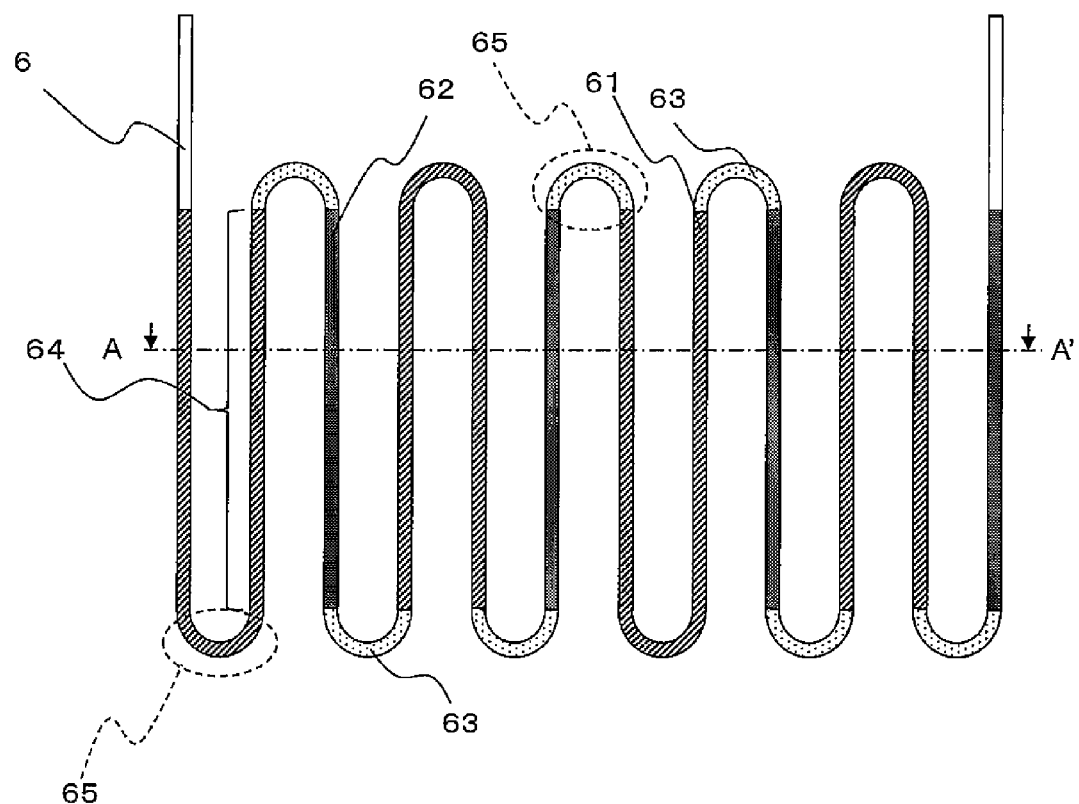
FIG. 11B is a developed view showing one example of a schematic configuration of the electric heater in Example 4 of Embodiment 1.

FIG. 10 is a horizontal cross-sectional schematic diagram showing one example of a schematic configuration of the hydrogen generator according to Example 4 of Embodiment 1. FIG. 11A is a conceptual diagram showing one example of a schematic configuration of the electric heater in Example 4 of Embodiment 1. FIG. 11B is a developed view showing one example of a schematic configuration of the electric heater in Example 4 of Embodiment 1. FIG. 11A is a cross-sectional view taken along line A-A' of FIG. 11B.

A hydrogen generator 140 according to the present example is the same as the hydrogen generator 100 according to Embodiment 1 shown in FIGS. 1 to 3 except that the configuration of the electric heater 6 is further specified. Therefore, in FIGS. 1 to 3 and FIGS. 10 and 11, the same reference signs and names are used for the same components, and detailed explanations thereof are omitted.

In the present example, the electric heater 6 is annularly provided in the gap 7 between the first wall 21 and the second wall 22 so as to extend in the axial direction of the first wall 21 and turn back in the axial direction of the first wall 21, and the linear portions of the heater include the first portions 61 contacting the first wall 21 and the second portions 62 contacting the second wall 22. As in the example shown in FIG. 10, in a case where the first wall 21 is provided at the inner side of the second wall 22, the radius R1 of the first portion 61 is smaller than the radius R2 of the second portion 62. In other words, in a case where the first wall 21 is provided at the inner side of the second wall 22, the distance R1 from the central axis of the first wall 21 to the first portion 61 is shorter than the distance R2 from the central axis of the first wall 21 to the second portion 62.

Further, the occupancy rate of the first portion 61 in the electric heater 6 and the occupancy rate of the second portion 62 in the electric heater 6 are adjusted in accordance with the heat capacities and temperature conditions of the reactor at the first wall 21 side and the reactor at the second wall 22 side. In the examples shown in FIGS. 10 and 11, since the first wall 21 is the wall of the hydro-desulfurizer 3, and the second wall 22 is the wall of the shift converter 5, the occupancy rate of the first portion 61 in the electric heater 6 and the occupancy rate of the second portion 62 in the electric heater 6 are changed in accordance with the heat capacities and temperature conditions of the hydro-desulfurizer 3 and the shift converter 5. With this, the amount of heat applied to each reactor can be adjusted, and the temperature of each reactor can be increased to a target temperature in a short period of time.

In the examples shown in FIGS. 10 and 11, a ratio of the first portion 61 to the second portion 62 is set to 2:1 but is not limited to this.

The same modifications as in Embodiment 1 can be made in the present example.

Example 5

The hydrogen generator according to Example 5 is the same as the hydrogen generator according to Example 1 in that: the hydrogen generator according to Example 5 is the hydrogen generator according to Embodiment 1 and further includes a reactor which needs to be heated; the second wall is a wall of the reactor; the electric heater includes a first portion contacting the first wall and a second portion contacting the second wall; and the electric heater may be configured such that a distance from a central axis of the first wall to the electric heater changes at an intervening portion between the first portion and the second portion.

In the present example, the gap may be formed such that the reactor is heated by radiation heat from the first portion.

According to this configuration, the first portion of the electric heater can heat both the hydro-desulfurizer and the reactor.

In the present example, the gap may be formed such that the hydro-desulfurizer is heated by the radiation heat from the second portion.

According to this configuration, the second portion of the electric heater can heat both the hydro-desulfurizer and the shift converter.

In the present example, the gap may include an air layer.

As with Example 1, the present example will explain a case where the reactor is the shift converter.

Figure 12A:
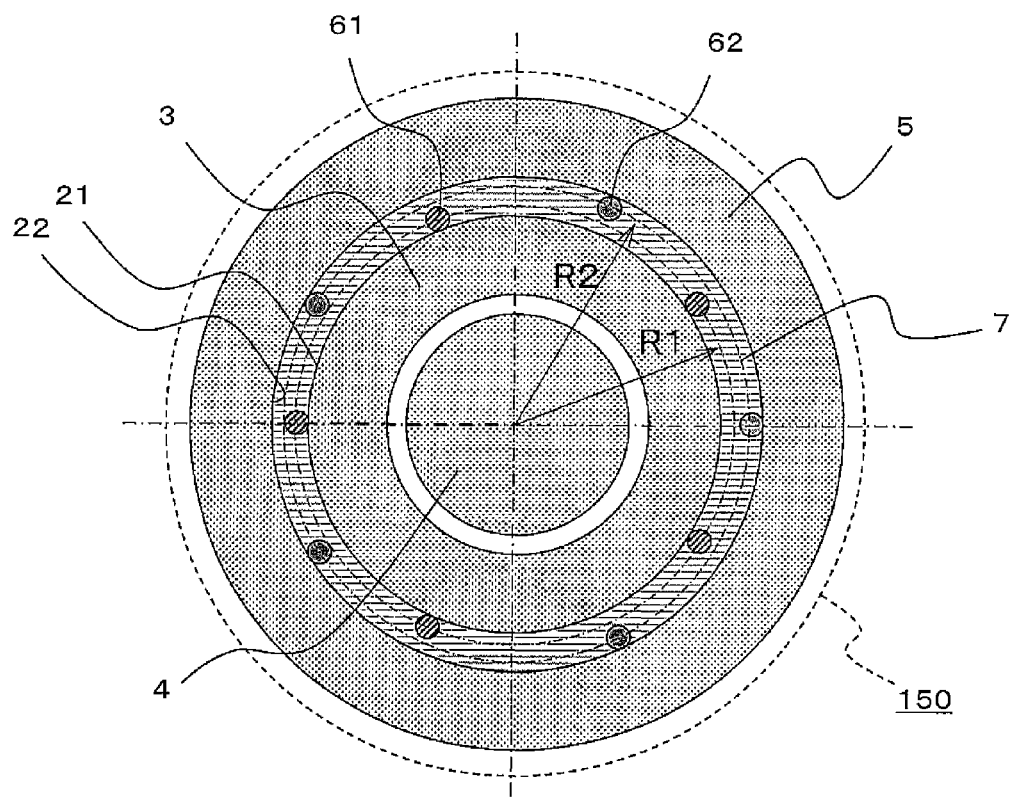
FIG. 12A is a horizontal cross-sectional schematic diagram showing one example of a schematic configuration of the hydrogen generator according to Example 5 of Embodiment 1.
Figure 12B:
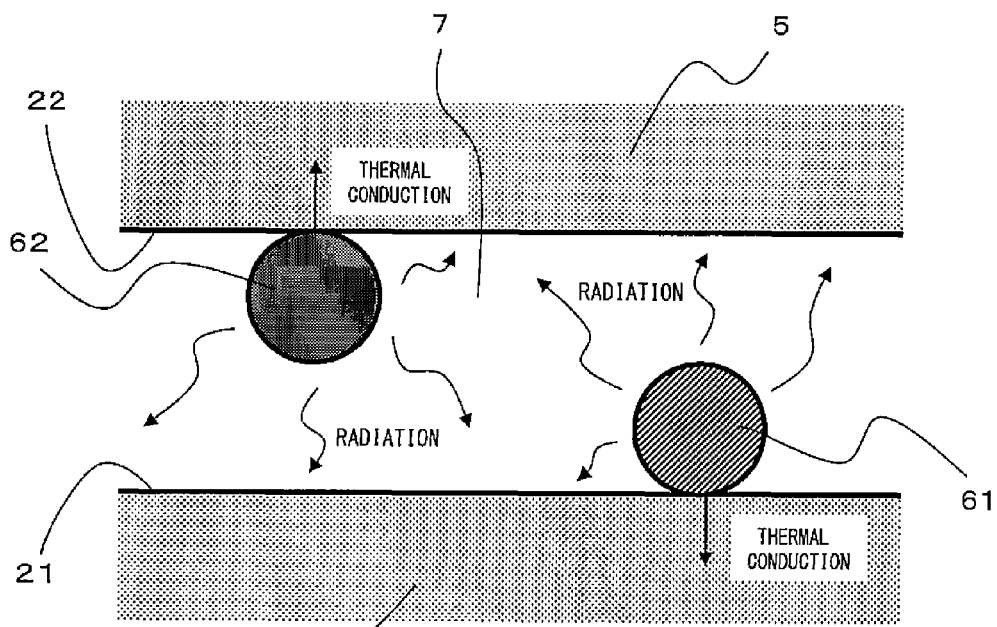
FIG. 12B is a conceptual diagram showing an action mechanism of the electric heater in Example 5 of Embodiment 1.

FIG. 12A is a horizontal cross-sectional schematic diagram showing one example of a schematic configuration of the hydrogen generator according to Example 5 of Embodiment 1. FIG. 12B is a conceptual diagram showing an action mechanism of the electric heater in Example 5 of Embodiment 1.

The hydrogen generator 110 according to the present example is the same as the hydrogen generator 100 according to Embodiment 1 shown in FIGS. 1 to 3 except that the configuration of the gap 7 is further specified. Therefore, in FIGS. 1 to 3 and FIG. 12, the same reference signs and names are used for the same components, and detailed explanations thereof are omitted.

In the present example, the electric heater 6 is annularly provided in the gap 7 between the first wall 21 and the second wall 22 so as to extend in the axial direction of the first wall 21 and turn back in the axial direction of the first wall 21, and the linear portions of the heater include the first portions 61 contacting the first wall 21 and the second portions 62 contacting the second wall 22. As in the example shown in FIG. 12, in a case where the first wall 21 is provided at the inner side of the second wall 22, the radius R1 of the first portion 61 is smaller than the radius R2 of the second portion 62. In other words, in a case where the first wall 21 is provided at the inner side of the second wall 22, the distance R1 from the central axis of the first wall 21 to the first portion 61 is shorter than the distance R2 from the central axis of the first wall 21 to the second portion 62.

Further, in the present example, the shift converter 5 is provided at the outer periphery of the hydro-desulfurizer 3 and reduces the carbon monoxide in the hydrogen-containing gas. The second wall 21 is the wall of the shift converter 5, and the gap 7 may be configured such that the shift converter 5 is heated by the radiation heat from the first portion 61. More specifically, for example, a heat insulating material does not have to be provided between the first portion 61 and the second wall 22 in the gap 7. According to this configuration, radiation such as infrared light can be transmitted between the first portion 61 and the second wall 22. Or, for example, the gap 7 may include the air layer. Or, for example, a space between the first portion 61 and the second wall 22 in the gap 7 may be the air layer. The shift converter 5 may be heated by the radiation heat from the first portion 61 through the air layer.

Or, in the present example, the gap 7 may be configured such that the hydro-desulfurizer 3 is heated by the radiation heat from the second portion 62. More specifically, for example, the heat insulating material does not have to be provided between the second portion 62 and the first wall 21 in the gap 7. According to this configuration, the radiation such as the infrared light can be transmitted between the second portion 62 and the first wall 21. Or, for example, the gap 7 may include the air layer. Or, for example, a space between the second portion 62 and the first wall 21 in the gap 7 may be the air layer. The hydro-desulfurizer 3 may be heated by the radiation heat from the second portion 62 through the air layer.

In the example shown in FIG. 12B, the first portion 61 and the first wall 21 physically contact each other in the gap 7, and the air layer is provided between the first portion 61 and the second wall 22. In addition, the second portion 62 and the second wall 22 physically contact each other in the gap 7, and the air layer is provided between the second portion 62 and the first wall 21.

According to this configuration, in the example shown in FIG. 12B, the heat generated at the first portion 61 of the electric heater 6 is supplied to the hydro-desulfurizer 3 by the thermal conduction and is also supplied to the shift converter 5 by the radiation. The heat generated at the second portion 62 of the electric heater 6 is supplied to the shift converter 5 by the thermal conduction and is also supplied to the hydro-desulfurizer 3 by the radiation. Therefore, the heat generated at the electric heater 6 can be efficiently supplied to both the hydro-desulfurizer 3 and the shift converter 5.

According to the configuration of the present example, the heat generated by the electric heater 6 is applied to the hydro-desulfurizer 3 and the shift converter 5 by not only the thermal conduction but also the radiation. With this, the heat utilization efficiency further improves.

The same modifications as in Embodiment 1 can be made in the present example. The present example may be combined with any of Examples 2 to 4.

Embodiment 2

A fuel cell system according to Embodiment 2 includes: the hydrogen generator according to any of Embodiment 1, Examples of Embodiment 1, and Modification Examples of Embodiment 1; and a fuel cell operative to generate electric power by using the hydrogen-containing gas supplied from the hydrogen generator.

According to this configuration, the performance of heating the desulfurizer can be made higher than before.

Figure 13:
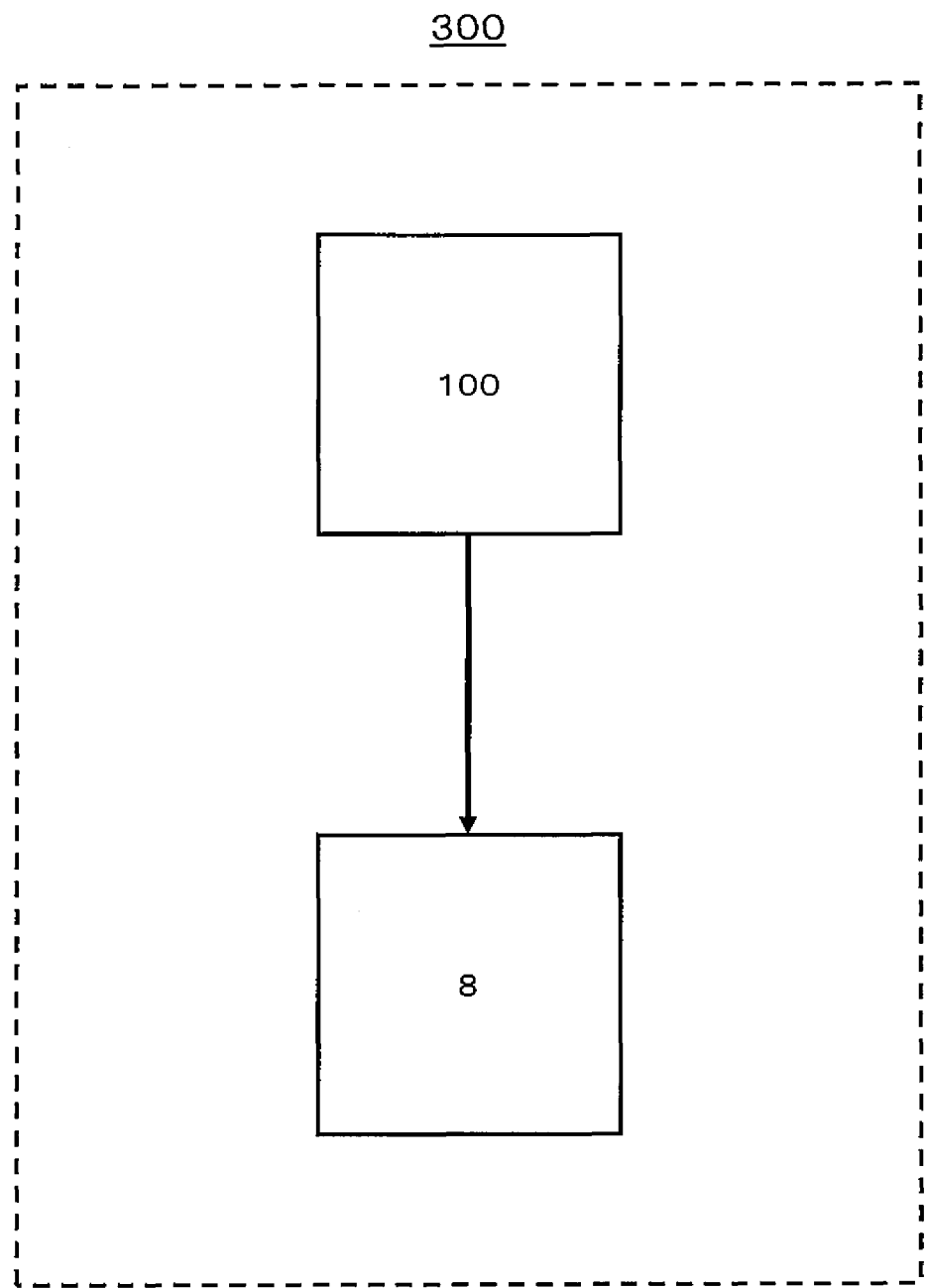
FIG. 13 is a block diagram showing one example of a schematic configuration of a fuel cell system according to Embodiment 2.
Figure 14:
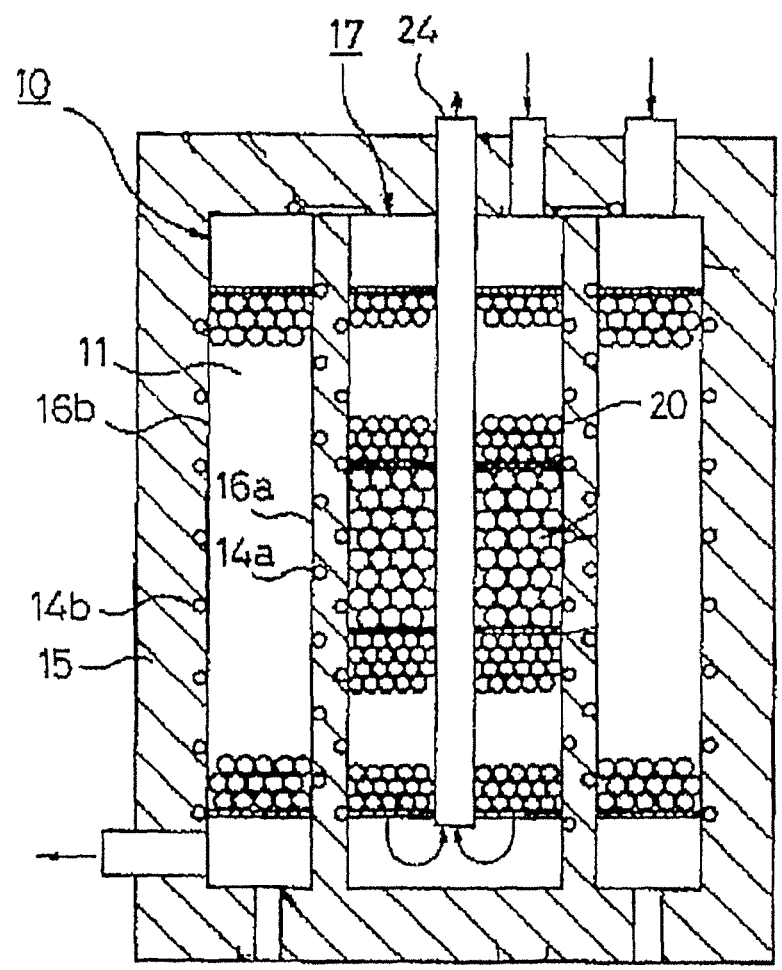
FIG. 14 is a cross-sectional view showing a schematic configuration of a carbon monoxide shift converter according to Example 1 of PTL 1.

FIG. 13 is a block diagram showing one example of a schematic configuration of the fuel cell system according to Embodiment 2.

A fuel cell system 300 according to the present embodiment includes the hydrogen generator 100 and a fuel cell 8. Since the hydrogen generator 100 is the same as the hydrogen generator 100 according to Embodiment 1 shown in FIG. 1, a detailed explanation thereof is omitted. It should be noted that the hydrogen generator 100 is just one example. The hydrogen generator 100 may be any of the hydrogen generators 110, 120, 130, and 140 according to Examples of Embodiment 1 and the hydrogen generators of Modification Examples.

The fuel cell 8 generates electric power by using the hydrogen-containing gas supplied from the hydrogen generator 100. The fuel cell may be any type, and examples of the fuel cell include a polymer electrolyte fuel cell, a solid-oxide fuel cell, and a phosphoric-acid fuel cell. In a case where the fuel cell is the solid-oxide fuel cell, the hydrogen generator and the fuel cell may be incorporated in a single container.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The aspect of the present invention is useful as the hydrogen generator and the fuel cell system, in each of which the performance of heating the desulfurizer is made higher than before.

REFERENCE SIGNS LIST 3 hydro-desulfurizer
4 reformer
5 shift converter
6 electric heater
7 gap
8 fuel cell
10 carbon monoxide shift converter
11 catalyst layer
14a heater
14b heater
15 heat insulating and retaining material
16a cylindrical inner wall
16b cylindrical wall
17 desulfurizer
20 cylindrical wall
21 first wall
22 second wall
24 desulfurizer outlet pipe
61 first portion
62 second portion
63 intervening portion
64 axially extending portion
65 axially turning-back portion
100 hydrogen generator
110 hydrogen generator
120 hydrogen generator
130 hydrogen generator
140 hydrogen generator
300 fuel cell system

The invention claimed is:

1. A hydrogen generator comprising:
a hydro-desulfurizer operative to remove a sulfur compound in a raw material and including a tubular first wall;
a reformer operative to generate a hydrogen-containing gas by using the raw material supplied from the hydro-desulfurizer;
a reactor including a tubular second wall provided coaxially with the first wall so as to be opposed to the first wall; and
an electric heater annularly provided in a gap between the first wall and the second wall so as to extend in an axial direction of the first wall and turn back in the axial direction of the first wall, wherein:
the electric heater includes a first portion contacting the first wall and a second portion contacting the second wall; and
a connecting portion, which connects the first portion and the second portion, has elasticity.

2. The hydrogen generator according to claim 1, wherein the electric heater is configured such that a distance from a central axis of the first wall to the electric heater gradually changes along a length of the connecting portion.

3. The hydrogen generator according to claim 2, wherein the reactor is a shift converter provided at an outer periphery of the hydro-desulfurizer and reduces carbon monoxide in the hydrogen-containing gas.

4. The hydrogen generator according to claim 3, wherein, in the electric heater, a total length of the first portion is greater than a total length of the second portion.

5. The hydrogen generator according to claim 1, wherein the gap is formed such that the reactor is heated by radiation heat from the first portion.

6. The hydrogen generator according to claim 5, wherein the gap includes an air layer.

7. The hydrogen generator according to claim 1, wherein the gap is formed such that the hydro-desulfurizer is heated by radiation heat from the second portion.

8. A fuel cell system comprising:
the hydrogen generator according to claim 1; and
a fuel cell operative to generate electric power by using the hydrogen-containing gas supplied from the hydrogen generator.

9. The hydrogen generator according to claim 1, wherein the electric heater has a serpentine shape.

10. The hydrogen generator according to claim 1, wherein the connecting portion has a U-shape.

11. The hydrogen generator according to claim 1, wherein the connecting portion extends axially between two U-shape portions.

12. The hydrogen generator according to claim 1, wherein the first portion contacts only the first wall but does not contact the second wall, and the second portion contacts the second wall but does not contact the first wall.

* * * * *